United States Patent
Ohashi et al.

(10) Patent No.: US 9,940,598 B2
(45) Date of Patent: Apr. 10, 2018

(54) APPARATUS AND METHOD FOR CONTROLLING EXECUTION WORKFLOWS

(71) Applicant: FUJITSU LIMITED, Kawasaki-shi, Kanagawa (JP)

(72) Inventors: Takamasa Ohashi, Toyoake (JP); Shoichi Kogiso, Nagoya (JP); Yusuke Kuchiwaki, Nagoya (JP); Masakazu Furukawa, Yoro (JP); Masahiro Fukuda, Nagoya (JP); Takashi Ikezaki, Yatomi (JP)

(73) Assignee: FUJITSU LIMITED, Kawasaki (JP)

( * ) Notice: Subject to any disclaimer, the term of this patent is extended or adjusted under 35 U.S.C. 154(b) by 983 days.

(21) Appl. No.: 14/222,740

(22) Filed: Mar. 24, 2014

(65) Prior Publication Data
US 2014/0297355 A1   Oct. 2, 2014

(30) Foreign Application Priority Data

Mar. 27, 2013   (JP) ................................. 2013-066847

(51) Int. Cl.
G06F 9/46       (2006.01)
G06Q 10/06   (2012.01)

(52) U.S. Cl.
CPC ... *G06Q 10/06316* (2013.01); *G06Q 10/0631* (2013.01); *G06Q 10/0633* (2013.01)

(58) Field of Classification Search
None
See application file for complete search history.

(56) References Cited

U.S. PATENT DOCUMENTS

| | | | |
|---|---|---|---|
| 6,502,122 B1 | 12/2002 | Takeuchi | |
| 7,296,056 B2* | 11/2007 | Yaung | G06Q 10/06 709/204 |
| 7,634,687 B2* | 12/2009 | Haselden | G06F 11/0793 706/25 |
| 7,680,683 B2* | 3/2010 | Hilerio | G06Q 10/06 705/7.27 |
| 8,181,150 B2* | 5/2012 | Szpak | G06F 8/10 717/104 |

(Continued)

FOREIGN PATENT DOCUMENTS

| | | |
|---|---|---|
| JP | 6-309213 A | 11/1994 |
| JP | 11-85544 A | 3/1999 |

(Continued)

OTHER PUBLICATIONS

Japanese Office Action dated Aug. 30, 2016 for corresponding Japanese Patent Application No. 2013-066847, with Partial English Translation, 5 pages.

*Primary Examiner* — Van Nguyen
(74) *Attorney, Agent, or Firm* — Fujitsu Patent Center

(57) ABSTRACT

A first executing unit executes, among tasks included in a first workflow, a first task group including one or more tasks using a resource. When a task included in the first task group is stopped, a rollback processing unit restores the resource to its former state prior to the execution of the first task group. After the resource is restored to the former state prior to the execution of the first task group, a second executing unit starts executing, among tasks included in a second workflow, a second task group including one or more tasks using the resource.

16 Claims, 40 Drawing Sheets

(56) References Cited

U.S. PATENT DOCUMENTS

| | | | |
|---|---|---|---|
| 8,284,423 B2 * | 10/2012 | Jahn | G06Q 10/06 |
| | | | 358/1.15 |
| 8,572,044 B2 * | 10/2013 | Booz | G06F 11/1474 |
| | | | 707/674 |
| 8,656,352 B2 * | 2/2014 | Szpak | G06F 8/10 |
| | | | 715/200 |
| 8,812,403 B2 * | 8/2014 | Mercuri | G06Q 10/103 |
| | | | 705/301 |
| 9,244,730 B2 * | 1/2016 | Lai | G06F 9/485 |
| 2006/0069605 A1 * | 3/2006 | Hatoun | G06Q 10/06 |
| | | | 705/7.15 |
| 2008/0172669 A1 * | 7/2008 | McCullough | G06F 9/5038 |
| | | | 718/102 |

FOREIGN PATENT DOCUMENTS

| | | |
|---|---|---|
| JP | 2001-257699 | 9/2001 |
| JP | 2003-256630 | 9/2003 |
| JP | 2010-9200 | 1/2010 |

\* cited by examiner

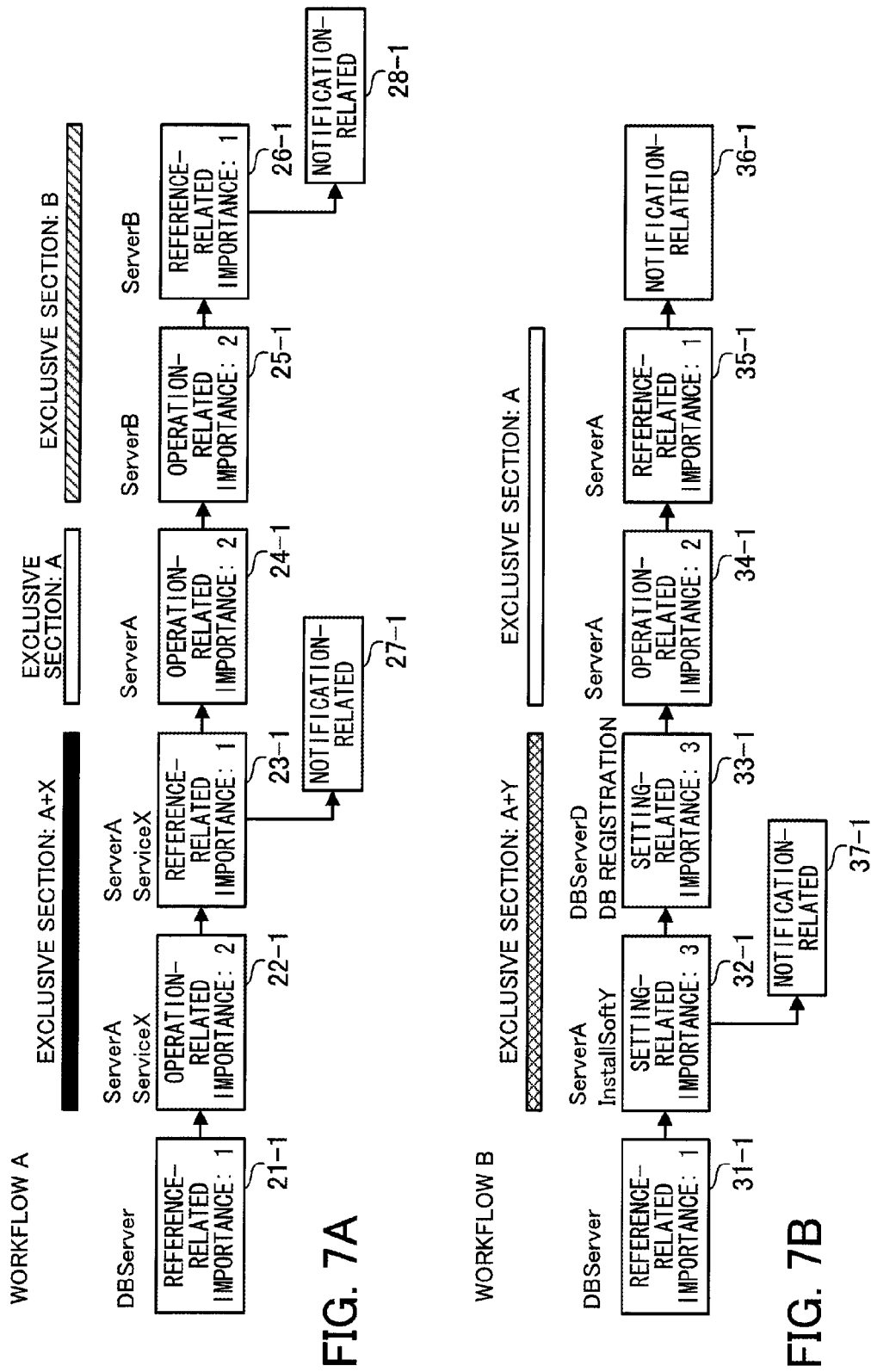

| NAME OF EXCLUSIVE SECTION HAVING ACQUIRED EXCLUSIVE RIGHT | NAME OF EXCLUSIVE SECTION ACQUIRING EXCLUSIVE RIGHT | | | | |
|---|---|---|---|---|---|
| | A | B | C | A+X | A+Y |
| A | ○ | × | × | ○ | ○ |
| B | × | ○ | × | × | × |
| C | × | × | ○ | × | × |
| A+X | ○ | × | × | ○ | × |
| A+Y | ○ | × | × | × | ○ |

○ : CONTENTION   × : NO CONTENTION

FIG. 8

WORKFLOW A
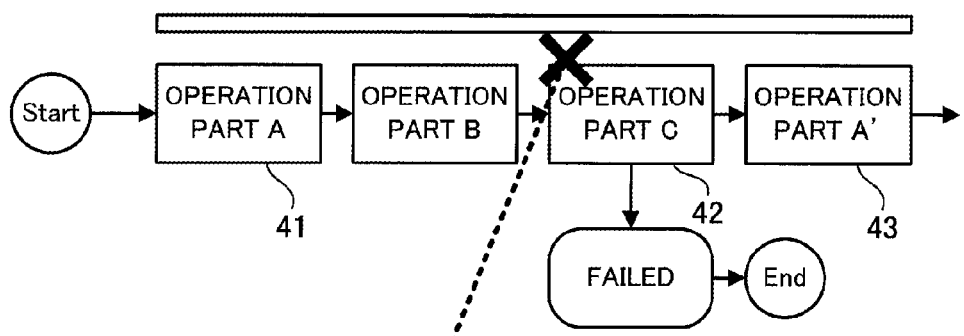
WORKFLOW B
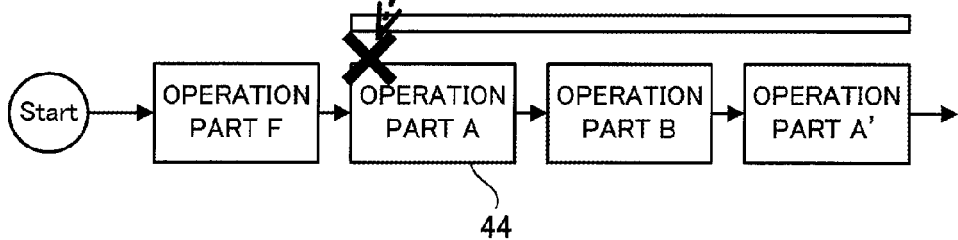
FIG. 15

FIG. 21

131 WORKFLOW MANAGEMENT TABLE

| WORKFLOW NO. | PART NO. | OPERATION PART NAME | OPERATION TARGET | OPERATION SERVICE OR RESOURCE | ... | BACKUP RESOURCE | OUTPUT | NEXT PART NO. |
|---|---|---|---|---|---|---|---|---|
| 1 | 0 | START | – | – | ... | – | – | 1 |
| | 1 | BRANCH START | – | – | ... | – | – | 2, 13 |
| | 2 | ACQUISITION OF OPERATION TARGET OR RESOURCE | – | – | ... | – | VARIABLE 2 | 3 |
| | 3 | SERVICE STOP | VARIABLE 1 | VARIABLE 2 | ... | VARIABLE a | VARIABLE 3 | 4 |
| | 4 | CONFIRMATION OF SERVICE STOP | VARIABLE 1 | VARIABLE 2 | ... | VARIABLE a | VARIABLE 3 | 5, 6 |
| | 5 | SERVER STOP | VARIABLE 1 | – | ... | VARIABLE b | – | 7 |
| | 6 | MAIL TRANSMISSION (ERROR NOTIFICATION) | – | – | ... | – | – | 99 |
| | 7 | SERVER START-UP | VARIABLE 1 | – | ... | VARIABLE b | – | 8 |
| | ... | ... | ... | ... | ... | ... | ... | ... |
| | 15 | PATCH APPLICATION | VARIABLE 1 | VARIABLE 2 | ... | VARIABLE c | VARIABLE 3 | 16 |
| | 16 | SERVICE START-UP | VARIABLE 1 | VARIABLE 2 | ... | VARIABLE a | – | 17 |
| | 17 | CONFIRMATION OF SERVICE START-UP | VARIABLE 1 | VARIABLE 2 | ... | VARIABLE a | – | 19 |
| | 18 | MAIL TRANSMISSION (ERROR NOTIFICATION) | – | – | ... | – | – | 99 |
| | 19 | BRANCH END | – | – | ... | – | – | 99 |
| | 99 | END | – | – | ... | – | – | – |
| ... | ... | ... | ... | ... | ... | ... | ... | ... |

132 OPERATION PART DEFINITION TABLE

| OPERATION PART NAME | PART TYPE | OPERATION/ CONFIRMATION TARGET | OPERATIONAL IMPORTANCE |
|---|---|---|---|
| SERVER START-UP | OPERATION-RELATED PART | SERVER | 2 (MEDIUM) |
| CONFIRMATION OF SERVER START-UP | CONFIRMATION-RELATED PART | SERVER | 1 (LOW) |
| SERVER STOP | OPERATION-RELATED PART | SERVER | 2 (MEDIUM) |
| CONFIRMATION OF SERVER STOP | CONFIRMATION-RELATED PART | SERVER | 1 (LOW) |
| SERVICE START-UP | OPERATION-RELATED PART | SERVICE | 2 (MEDIUM) |
| CONFIRMATION OF SERVICE START-UP | CONFIRMATION-RELATED PART | SERVICE | 1 (LOW) |
| MAIL TRANSMISSION | NOTIFICATION-RELATED PART | – | 1 (LOW) |
| SOFTWARE INSTALLATION | SETTING-RELATED PART | SERVICE | 3 (HIGH) |
| ... | ... | ... | ... |

FIG. 22

133 VARIABLE MANAGEMENT TABLE

| INSTANCE NO. | WORKFLOW NO. | VARIABLE NAME | VARIABLE VALUE |
|---|---|---|---|
| 1 | 1 | VARIABLE 1 | hostA |
| 1 | 1 | VARIABLE 2 | serviceA |
| 2 | 1 | VARIABLE 1 | hostA |
| 2 | 1 | VARIABLE 2 | serviceA |
| 11 | 2 | VARIABLE 1 | hostA |
| 11 | 2 | VARIABLE 3 | softwareA |
| ... | ... | ... | ... |

134 INSTANCE MANAGEMENT TABLE

| INSTANCE NO. | WORKFLOW NO. | PART NO. (CURRENTLY BEING EXECUTED) | HOST NAME | SERVICE NAME | USER ID | START-UP METHOD COEFFICIENT | EXCLUSIVE SECTION NO. | SCHEDULED TIME OF COMPLETION |
|---|---|---|---|---|---|---|---|---|
| 1 | 1 | 5 | VARIABLE 1 | VARIABLE 2 | USER 2 | 1 | 1 | 20:10 |
| 1 | 1 | 5 | VARIABLE 1 | | USER 2 | 2 | 2 | 20:10 |
| 2 | 1 | 1 | VARIABLE 1 | VARIABLE 2 | USER 2 | 3 | 3 | 20:12 |
| 2 | 1 | 1 | VARIABLE 1 | | USER 2 | 1 | 4 | 20:12 |
| 11 | 2 | 1 | VARIABLE 1 | | USER 1 | 2 | | 20:15 |
| ... | ... | ... | ... | ... | ... | ... | ... | ... |

FIG. 24

135 EXCLUSIVE SECTION MANAGEMENT TABLE

| EXCLUSIVE SECTION NO. | PART NO. (LOCK START) | PART NO. (LOCK RELEASE) | EXECUTION PRIORITY | OPERATIONAL URGENCY |
|---|---|---|---|---|
| 1 | 1 | 5,9,10,11 | 2 | 1 |
| 2 | 4 | 8 | 2 | 1 |
| 3 | 1 | 5,9,10,11 | 2 | 1 |
| 4 | 4 | 8 | 2 | 1 |
| ... | ... | ... | ... | ... |

FIG. 25

136 EXCLUSIVE RIGHT ACQUISITION HISTORY TABLE

| INSTANCE NO. | WORKFLOW NO. | EXCLUSIVE SECTION NO. | START-WAITING TIME | START TIME | COMPLE-TION TIME | ... |
|---|---|---|---|---|---|---|
| 1 | 1 | 1 | 5:00 | 20:10 | | ... |
| 2 | 2 | 4 | 0 | 20:03 | | ... |
| 3 | 3 | 1 | 0 | 20:00 | 20:10 | ... |
| 3 | 3 | 2 | 10:00 | | | ... |
| ... | ... | ... | ... | ... | ... | ... |

FIG. 26

138 START-UP METHOD COEFFICIENT TABLE

| START-UP METHOD | START-UP METHOD COEFFICIENT | ... |
|---|---|---|
| MANUAL START-UP | 2 | ... |
| SCHEDULED START-UP AT SPECIFIED TIME | 1 | ... |
| START-UP WITH NOTICE FROM MONITORING SYSTEM | 3 | ... |

FIG. 28

139 TIME COEFFICIENT TABLE

| REMAINING TIME | TIME COEFFICIENT | ... |
|---|---|---|
| 10 | hostA | ... |
| 20 | serviceA | ... |
| NULL | serviceA | ... |

140 PAIRED PART DEFINITION TABLE

| GO | | BACK | |
|---|---|---|---|
| OPERATION PART | OPTION | OPERATION PART | OPTION |
| SERVICE START-UP | hostname | SERVICE STOP | hostname |
| | service | | service |
| | ostype | | ostype |
| | username | | username |
| | password | | password |
| | execusername | | execusername |
| | exepassword | | exepassword |
| WORK UNIT START-UP | hostname | WORK UNIT STOP | hostname |
| | wuname | | wuname |
| | oparationtype | | oparationtype |
| | systemname | | systemname |
| | mwtype | | mwtype |
| | mwinstallpath | | mwinstallpath |
| | ostype | | ostype |
| | usename | | usename |
| | password | | password |
| | execusername | | execusername |
| | exepassword | | exepassword |
| ... | ... | ... | ... |

FIG. 30

APPARATUS AND METHOD FOR CONTROLLING EXECUTION WORKFLOWS

CROSS-REFERENCE TO RELATED APPLICATION

This application is based upon and claims the benefit of priority of the prior Japanese Patent Application No. 2013-066847, filed on Mar. 27, 2013, the entire contents of which are incorporated herein by reference.

FIELD

The embodiments discussed herein are related to a workflow control apparatus and a method therefor.

BACKGROUND

A business system is composed of many resources including a number of apparatuses, such as servers, storages, and network equipment; and programs, such as operating systems (OS), middleware, and applications installed on the apparatuses. In a situation where a plurality of such business systems are in operation, a data center carries out operational work, such as monitoring and maintenance, of the business systems.

In recent years, Runbook Automation (RBA) has attracted attention as a technology for advancing operations automation by expressing operational work of business systems in workflows. RBA is expected to have various effects including reduction in operation load by automating simple tasks, reduction of human errors, and reduction in operational costs.

As for technology related to workflows, there is provided, for example, a data flow management system for managing, in a management table, access rights given to individual users who perform tasks on documents and causing, when a flow manager creates a document flow on a definition screen, only users having access rights to a document concerned to be defined in the document flow with reference to the management table.
Japanese Laid-open Patent Publication No. 2003-256630

In the case where a first and a second workflow individually including tasks using the same resource are executed, the tasks of the individual workflows, using the same resource, are carried out in a mutually exclusive manner. Assuming for example that a failure has occurred in a task of the first workflow, using the resource, stopping the execution of the first workflow and then transferring the exclusive right to the second workflow allows the operation of the second workflow to continue. However, simply stopping the execution of the first workflow may subsequently lead to a failure when the tasks of the second workflow, using the resource, are executed.

SUMMARY

According to one embodiment, there is provided a computer-readable non-transitory storage medium storing therein a control program that controls execution of a first workflow and a second workflow. The control program causing a computer to execute a procedure includes monitoring execution of the workflow; identifying a top task of a series of tasks when execution of one of tasks included in the first workflow is stopped, the series of tasks being included in the first workflow, including the stopped task and using a same resource; restoring the resource to its former state prior to the execution of the top task; and starting execution of a task included in the second workflow.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 7A and 7B illustrate processing for determining exclusive sections based on the same operation targets and the use of the same variables;

FIG. 8 illustrates a lock contention relationship of the exclusive sections;

FIG. 15 illustrates an effect on a different exclusive section in a case of stopping a task in an exclusive section;

FIG. 21 illustrates an example of a workflow management table;

FIG. 22 illustrates an example of an operation part definition table;

FIG. 24 illustrates an example of an instance management table;

FIG. 25 illustrates an example of an exclusive section management table;

FIG. 26 illustrates an example of an exclusive right acquisition history table;

FIG. 28 illustrates an example of a start-up method coefficient table;

FIG. 30 illustrates an example of a paired parts definition table;

DESCRIPTION OF EMBODIMENTS

Figure 1:
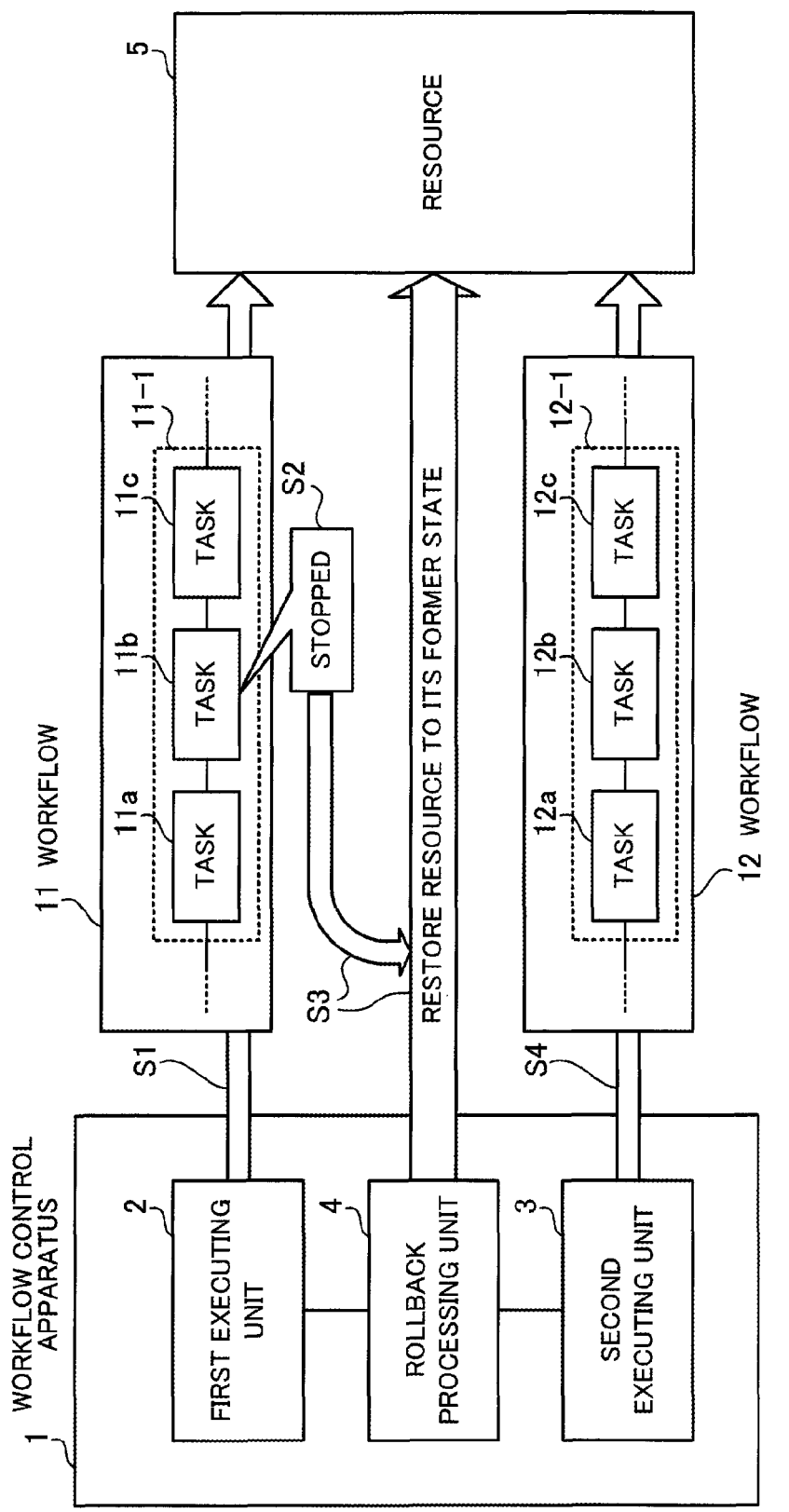
FIG. 1 illustrates a configuration and operation example of an operational system according to a first embodiment.

Several embodiments will be described below with reference to the accompanying drawings, wherein like reference numerals refer to like elements throughout.

(a) First Embodiment

FIG. 1 illustrates a configuration and operation example of an operational system according to a first embodiment. The operational system of FIG. 1 includes a workflow control apparatus 1 and one or more resources. A single resource 5 is depicted in FIG. 1, as an example. The workflow control apparatus 1 controls execution of a plurality of workflows. Each workflow includes one or more tasks. Each task included in a workflow is for carrying out some sort of operation on a resource, for example, monitoring and maintenance of the resource. The term 'resources' here means, for example, external apparatuses of the workflow control apparatus 1 and programs to be executed by the external apparatuses. Note that contents of the tasks and a processing order of each workflow are defined, for example, in workflow definition information (not illustrated). In the following description, 'to execute a workflow' means executing tasks according to information defined in the workflow definition information.

The workflow control apparatus 1 includes a first executing unit 2, a second executing unit 3, and a rollback processing unit 4. Processes of the first executing unit 2, the second executing unit 3, and the rollback processing unit 4 are implemented, for example, by execution of a predetermined program by a processor of the workflow control apparatus 1. The first executing unit 2 executes a workflow 11. The second executing unit 2 executes a workflow 12. Both the workflows 11 and 12 include tasks using the same resource 5. According to the example of FIG. 1, the workflow 11 contains a task group 11-1 including tasks 11a to 11c individually using the resource 5. Similarly, the workflow 12 contains a task group 12-1 including tasks 12a to 12c individually using the resource 5. Note, for example, that the task groups 11-1 and 12-1 both using the same resource 5 are executed in a mutually exclusive manner. This enables the consistency of the tasks of the individual task groups to be maintained.

When a task included in a task group of a workflow is stopped, the rollback processing unit 4 restores an operation-target resource of the task group to its former state prior to the execution of the task group including the stopped task. Once the resource is restored to its former state prior to the execution of the task group, the execution of a task group of another workflow, using the same resource, is started.

Next described is a processing example in which the task group 11-1 of the workflow 11 is being executed. The first executing unit 2 sequentially executes individual tasks of the task group 11-1 (step S1). Assume here that the execution of the task 11b included in the task group 11-1 is stopped (step S2). The execution of the task 11b may be stopped due to the occurrence of a failure during the execution of the task 11b. When the execution of the task 11b is stopped, the rollback processing unit 4 restores the resource 5 to its former state prior to the execution of the task group 11-1 (step S3). Once the resource 5 is restored to its former state prior to the execution of the task group 11-1, the second executing unit 3 starts the execution of the task group 12-1 of the second workflow 12 (step S4).

According to the above-described processing, when the execution of the task 11b is stopped, the execution of the task group 12-1 of the other workflow 12 is not started until the resource 5 is restored to its former state prior to the execution of the task group 11-1. This reduces the likelihood of failure occurrence during the execution of the task group 12-1.

Let us consider the case where, after the execution of a task group is stopped, a task of the task group which task comes after the stop point in order is not executed. This may subsequently have an adverse effect on the execution of a task group of a different workflow, using the same resource. An example of such a case is when the stopped task group includes two tasks to be executed in pairs. Of the tasks to be executed in pairs, a task to be executed first is here referred to as the 'foregoing task' and a task to be executed later is referred to as the 'following task'. Assume in the following description that the tasks 11a and 11c are executed in pairs where the task 11a is a foregoing task and the task 11c is a following task. In addition, assume that the operation content of the task 12a of the workflow 12 is the same as that of the task 11a.

The following task (the task 11c) being executed after the execution of the foregoing task (the task 11a) ensures that, for example, when the same foregoing task (the task 12a) included in a different workflow and using the same resource is subsequently executed, the resource has been restored to such a state that allows the foregoing task (the task 12a) to be successfully executed. In addition, the following task (the task 11c) may be an operation enabling a setting or program change made to the resource by an intermediate task (the task 11b) between the following task (the task 11c) and its corresponding foregoing task (the task 11a) to be correctly applied to the resource, to thereby make the resource operate in a stable manner.

As in the above-described case, when the operation of the task group 11-1 of the workflow 11 is stopped in the middle and not completed successfully, the following task in the task group 11-1 may fail to be executed. In this case, if no measures are provided for the task group 11-1 when the operation is stopped and then the execution of the task group 12-1 of the workflow 12 is started, it is more likely that a failure occurs during the execution of the task group 12-1. For example, in the case where the same task (the task 12a) as the foregoing task (the task 11a) in the task group 11-1 is included in the task group 12-1, this task (the task 12a) may fail to be executed successfully. In addition, the resource 5 may remain in an unstable state due to the following task (the task 11c) in the task group 11-1 being not executed, which may lead to the occurrence of a failure during the execution of the task group 12-1.

On the other hand, the workflow control apparatus 1 according to the first embodiment restores the resource 5 to its former state prior to the execution of the task group 11-1 when the execution of the task 11b is stopped. This ensures that the resource 5 is restored to, at least, its former state prior to the execution of the foregoing task (the task 11a) involving the need of executing the corresponding following task (the task 11c). The resource 5 in this state allows, for example, the foregoing task (the task 11a) in the task group 11-1 to be executed successfully, and also allows the same foregoing task (the task 12a) in the task group 12-1 to be executed successfully. Therefore, when the same foregoing task (the task 12a) in the task group 12-1 is executed after the resource 5 is restored to its former state, the execution would be successful. In addition, for example, when being restored to its former state prior to the execution of the task group 11-1, the resource 5 may change into a stable state from an unstable state. Therefore, it is possible to reduce the likelihood of failure occurrence during the execution of the task group 12-1 in the different workflow 12 by starting the execution of the task group 12-1 after the resource 5 is restored to its former state prior to the execution of the task group 11-1.

(b) Second Embodiment

Figure 2:
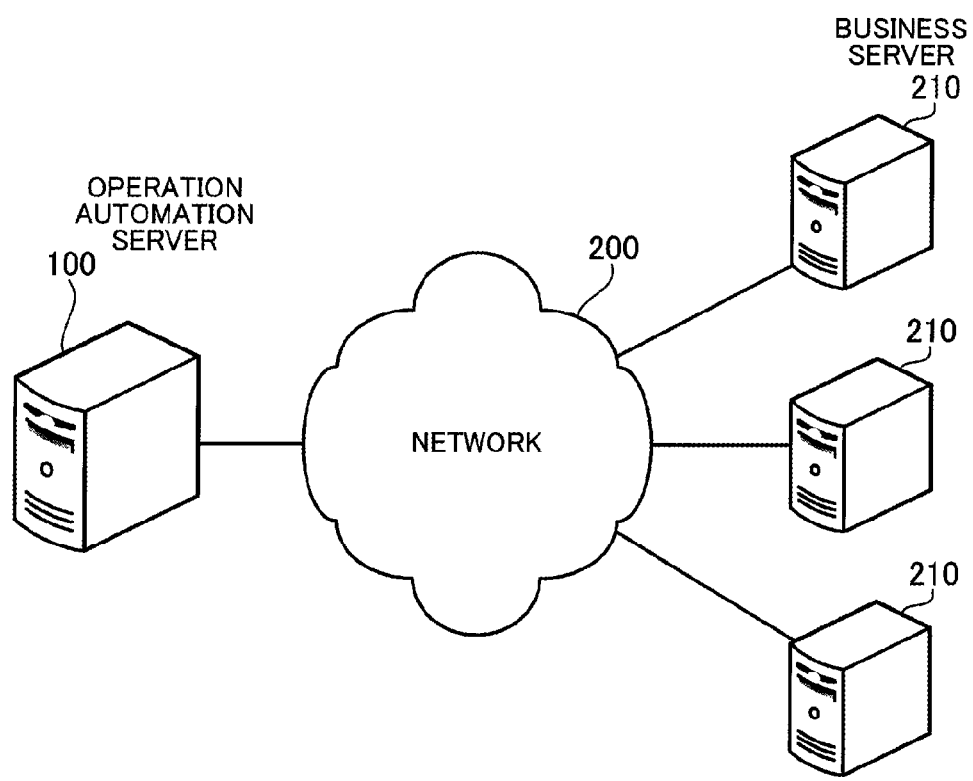
FIG. 2 illustrates a configuration example of an operational system according to a second embodiment.

FIG. 2 illustrates a configuration example of an operational system according to a second embodiment. The operational system of FIG. 2 includes an operation automation server 100 and one or more business servers 210. The operation automation server 100 and the business servers 210 are connected to each other via a network 200. The business servers 210 carry out various types of business processes. The operation automation server 100 manages operational work, such as monitoring and maintenance, of the business servers 210 by automating the operational work. Using RBA, the operation automation server 100 manages operations of the business servers 210 according to workflows describing operational work procedures of the business servers 210.

Figure 3:
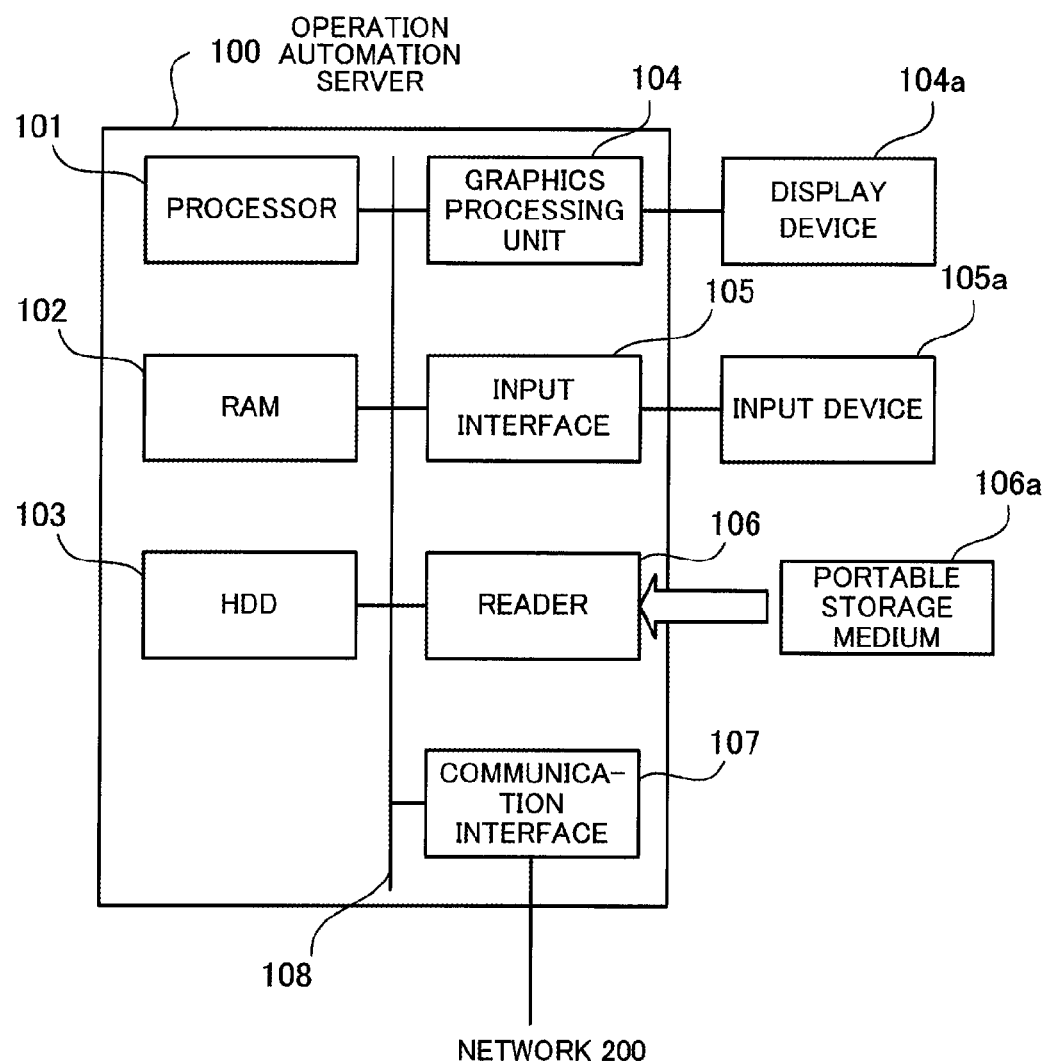
FIG. 3 illustrates an example of a hardware configuration of an operation automation server.

FIG. 3 illustrates an example of a hardware configuration of an operation automation server. The operation automation server 100 is implemented, for example, as a computer of FIG. 3. Overall control of the operation automation server 100 is exercised by a processor 101. To the processor 101, a random access memory (RAM) 102 and a plurality of peripherals are connected via a bus 108. The processor 101 may be a multi-processor. The processor 101 is, for example, a central processing unit (CPU), a micro processing unit (MPU), a digital signal processor (DSP), an application specific integrated circuit (ASIC), or a programmable logic device (PLD). Alternatively, the processor 101 may be a combination of two or more of these devices.

The RAM 102 is used as a main storage device of the operation automation server 100. The RAM 102 temporarily stores therein at least part of an OS program and application programs to be executed by the processor 101. The RAM 102 also stores therein various types of data to be used by the processor 101 for its processing. The peripherals connected to the bus 108 include a hard disk drive (HDD) 103, a graphics processing unit 104, an input interface 105, a reader 106, and a communication interface 107.

The HDD 103 is used as a secondary storage device of the operation automation server 100. The HDD 103 stores therein the OS program, application programs, and various types of data. Note that, as a secondary device, a different type of non-volatile storage device such as a solid state drive (SSD) may be used in place of the HDD 103.

To the graphics processing unit 104, a display device 104a is connected. According to an instruction from the processor 101, the graphics processing unit 104 displays an image on a screen of the display device 104a. A cathode ray tube (CRT) display or a liquid crystal display, for example, may be used as the display device 104a.

To the input interface 105, an input device 105a is connected. The input interface 105 transmits signals output from the input device 105a to the processor 101. The input device 105a is, for example, a keyboard or a pointing device. Examples of the pointing device include a mouse, a touch panel, a tablet, a touch-pad, and a track ball.

On the reader 106, a portable storage medium 106a is loaded. The reader 106 reads data recorded on the portable storage medium 106a and transmits the read data to the processor 101. The portable storage medium 106a may be an optical disk, a magneto optical disk, or a semiconductor memory, for example.

Via the network 200, the communication interface 107 transmits and receives data to and from different apparatuses such as the business servers 210.

The hardware configuration described above achieves processing functions of the operation automation server 100. Note that the business servers 210 of FIG. 2 and the workflow control apparatus 1 of FIG. 1 may also be individually implemented as a computer with the hardware of FIG. 3.

Figure 4:
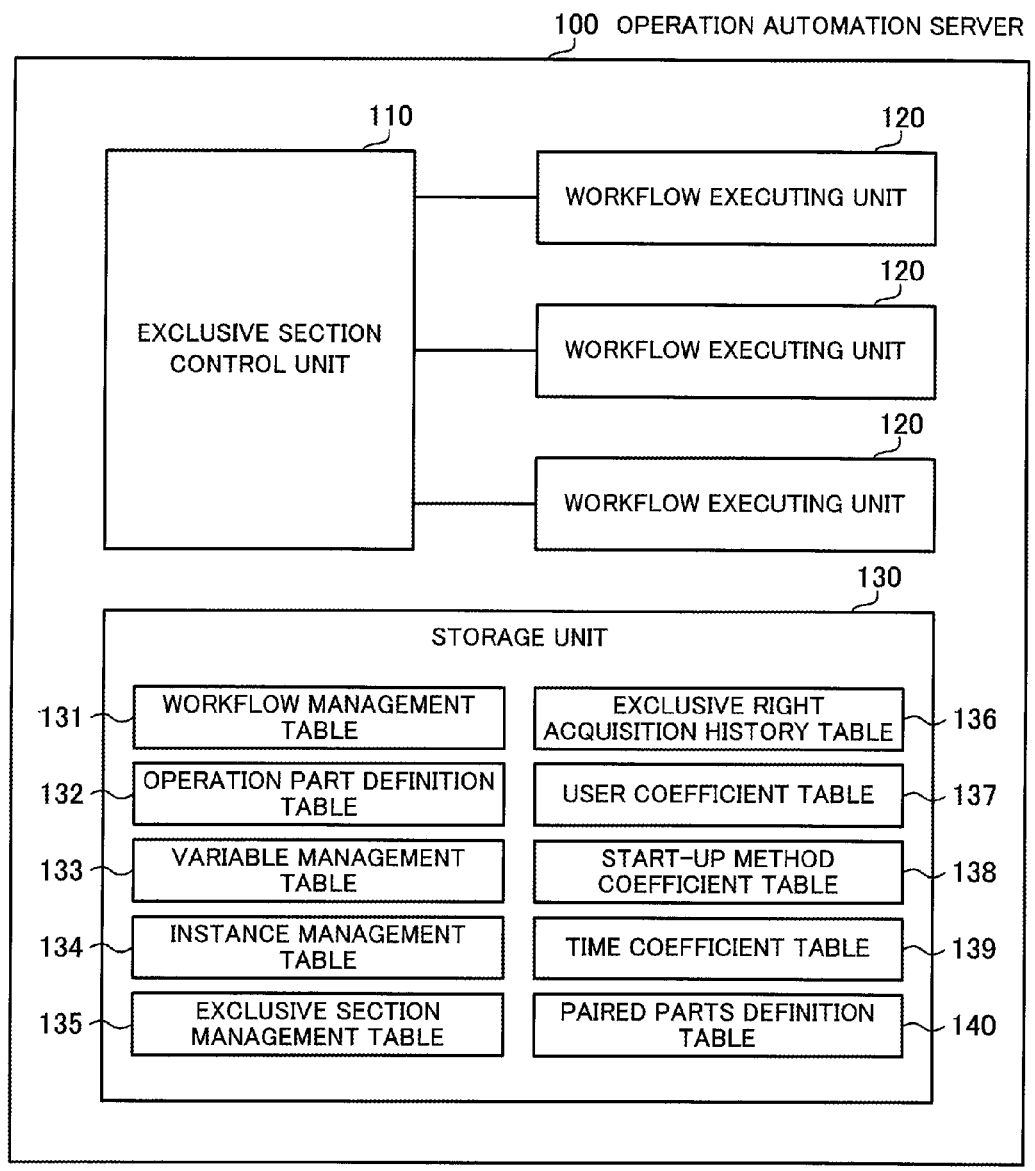
FIG. 4 is a block diagram illustrating a configuration example of processing functions of the operation automation server.

FIG. 4 is a block diagram illustrating a configuration example of processing functions of an operation automation server. The operation automation server 100 includes an exclusive section control unit 110 and workflow executing units 120. Processes of the exclusive section control unit 110 and the workflow executing units 120 are implemented, for example, by execution of predetermined programs by the processor 101 of the operation automation server 100.

The exclusive section control unit 110 manages the execution of workflows. The term 'exclusive section' in this specification refers to a predetermined section of a workflow, during which exclusive control is exercised. The term 'exclusive control' refers to control exercised in the case where a plurality of workflows are running at the same time and contention would take place if the workflows use a common resource at the same time. The exclusive control allows only one workflow to run at a time and puts other workflows into a process wait state, to thereby avoid the contention for the resource. The exclusive section control unit 110 dynamically determines exclusive sections during the execution of the workflows. Once determining the exclusive sections, the exclusive section control unit 110 controls an execution sequence of the workflows according to anticipated operation execution priority. When a task included in an exclusive section is stopped due to, for example, the occurrence of a failure, the exclusive section control unit 110 rolls the operation back to the beginning of the exclusive section and, then, releases the exclusive control. This allows a workflow other than the workflow including the stopped task to proceed its operation using an operation-target resource of the exclusive section, to thereby prevent operation stagnation.

The workflow executing units 120 execute workflows under the control of the exclusive section control unit 110. The workflow executing units 120 are provided in one-to-one correspondence with workflows. That is, in the case where a plurality of workflows are executed, there are provided a plurality of workflow executing units 120. Note in the following that when simply referred to as 'the workflow executing unit 120', it means one of the workflow executing units 120, associated with a workflow concerned.

The operation automation server 100 also includes a storage unit 130 for storing various types of information used for processes of the exclusive section control unit 110 and the workflow executing units 120. The storage unit 130 stores therein a workflow management table 131, an operation part definition table 132, a variable management table 133, an instance management table 134, an exclusive section management table 135, an exclusive right acquisition history table 136, a user coefficient table 137, a start-up method coefficient table 138, a time coefficient table 139, and a paired parts definition table 140.

The workflow management table 131 stores therein information of operation parts included in individual workflows. The operation part definition table 132 stores therein definition information of the operation parts.

The variable management table 133 stores therein variable names and values used in instances. The instance management table 134 stores therein information managed for each of the instances.

The exclusive section management table 135 stores therein information of exclusive sections. The exclusive right acquisition history table 136 stores therein history information regarding exclusive right (execution right) acquisition of the exclusive sections.

The user coefficient table 137 stores therein user coefficients for individual users. The start-up method coefficient table 138 stores therein start-up method coefficients for individual workflow start-up methods. The time coefficient table 139 stores therein time coefficients for individual remaining time periods until an operation is completed.

The paired parts definition table 140 stores therein information of paired operation parts. The paired parts definition table 140 is referenced by the exclusive section control unit 110 in a rollback process.

Next described are processes carried out by the operation automation server 100 in detail. First, 'dynamic exclusive control during execution of workflow' that is a basic process of the operation automation server 100 is described, which is then followed by a description of 'rollback process when operation is stopped'.

<Dynamic Exclusive Control During Execution of Workflow>

During the execution of a plurality of workflows, the operation automation server 100 dynamically determines appropriate exclusive sections according to the progress of each workflow. When a workflow starts running, the exclusive section control unit 110 provisionally determines an exclusive section based on types of operation parts included in the workflow and resources to be used (operation targets and variables). Based on the provisionally determined exclusive section, the exclusive section control unit 110 dynamically determines exclusive sections when the workflow is running in view of the progress of the execution of other workflows and their exclusive control situation. Here, the term 'operation parts' refers to scripts directed to the business servers 210 to cause the business servers 210 to automatically execute individual tasks included in workflows.

In addition, when determining exclusive sections, the exclusive section control unit 110 takes into account a workflow having acquired an exclusive right, information of scheduled acquisition of an exclusive right by other workflows having yet to acquire the exclusive right, and execution priority, and thereby exercises exclusive control based on a prediction. Therefore, the exclusive section control unit 110 makes timely and appropriate changes to the operation sequence of workflows.

Figure 5:
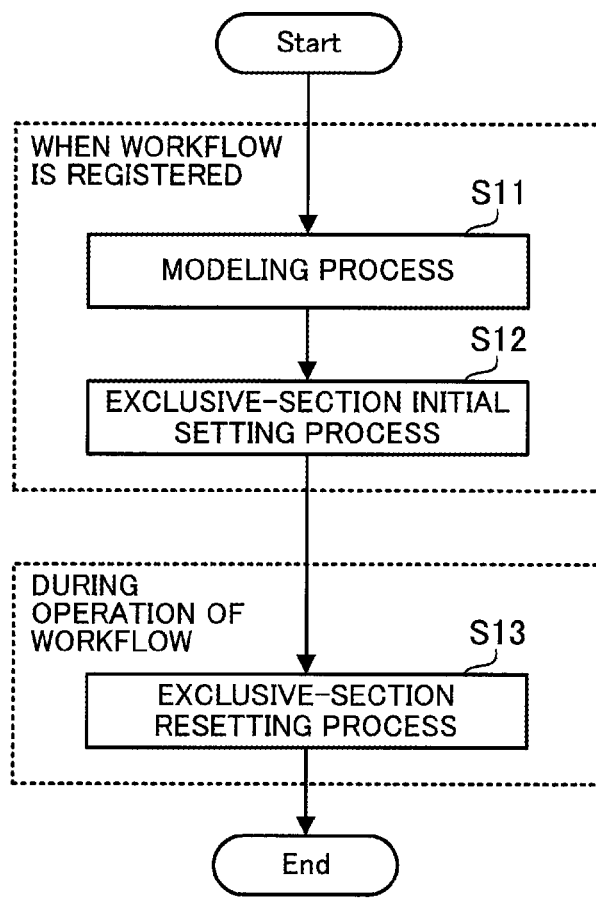
FIG. 5 is a flowchart illustrating an example of general processes of the operation automation server.

FIG. 5 is a flowchart illustrating an example of general processes of an operation automation server. When a workflow is registered in the operation automation server 100, the exclusive section control unit 110 carries out a modeling process (step S11) and an exclusive-section initial setting process (step S12). In addition, when the workflow is running, the exclusive section control unit 110 carries out an exclusive-section resetting process (step S13).

First explained are the processes carried out when a workflow is registered. The modeling process (step S11) includes the following processing. The exclusive section control unit 110 groups operation parts of the registered workflow by the content of the operation parts, and then defines operational importance of each group. For example, the exclusive section control unit 110 sets the operational importance of setting-related operation parts, such as information registration in the business server 210 and setting of a network, to 'high' (or '3'). In addition, the exclusive section control unit 110 sets the operational importance of operation-related operation parts, such as restart of the OS and start-up of a service, to 'medium' (or '2'). The exclusive section control unit 110 sets the operational importance of reference-, confirmation-, and notification-related operation parts, such as confirmation of the server/service status, to 'low' (or '1'). This allows operation parts defined in the workflow to be models (i.e., simplified representations), as explained in FIGS. 6A and 6B below. In a modeled workflow, the operational importance is determined for each operation part.

Figure 6A:
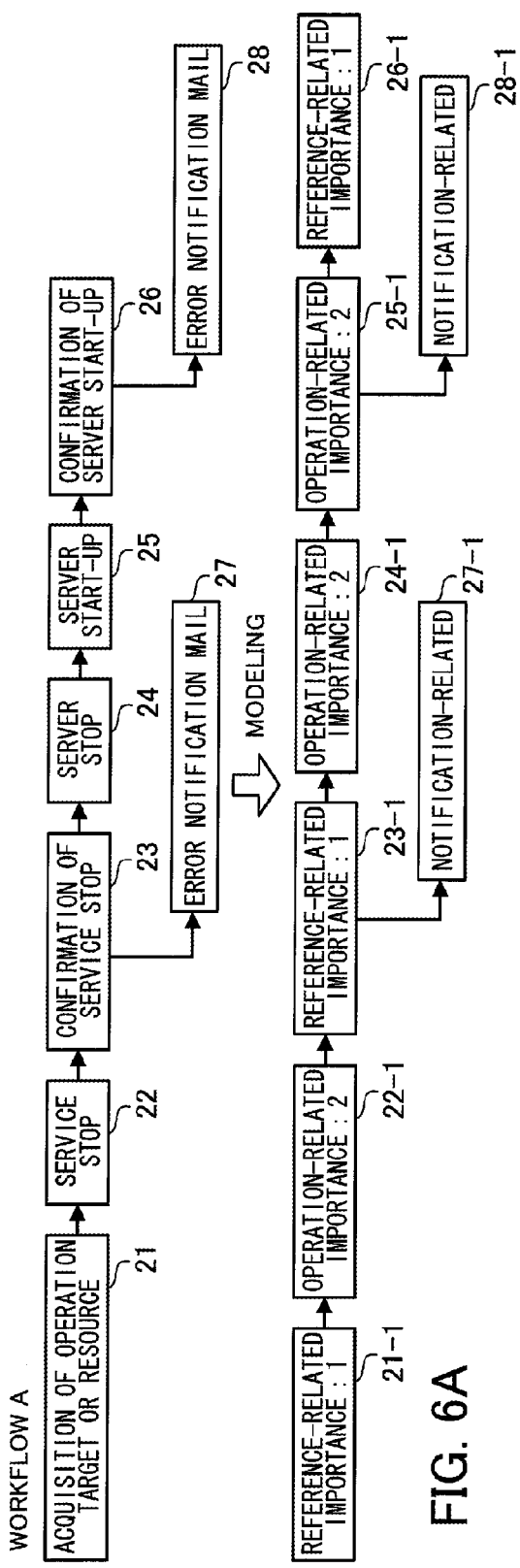
FIGS. 6A and 6B illustrate modeling of operation parts defined in workflows.
Figure 6B:
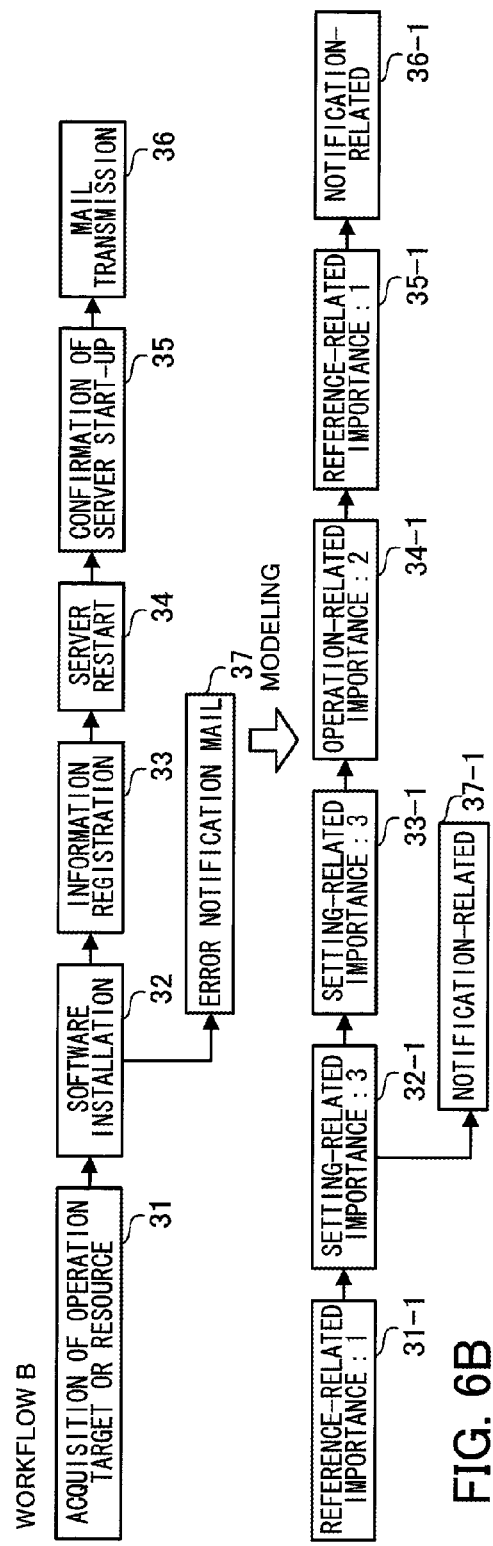

FIGS. 6A and 6B illustrate modeling of operation parts defined in workflows. According to an example of FIG. 6A, the following operation parts are defined in workflow A: 'acquisition of operation target or resource' 21; 'service stop' 22; 'confirmation of service stop' 23; 'server stop' 24; 'server start-up' 25; 'confirmation of server start-up' 26; and 'error notification mail' 27 and 28. According to FIG. 6B, the following operation parts are defined in workflow B: 'acquisition of operation target or resource' 31; 'software installation' 32; 'information registration' 33; 'server restart' 34; 'confirmation of server start-up' 35; 'mail transmission' 36; and 'error notification mail' 37.

When workflow A is modeled, the individual operation parts are changed as follows: 'acquisition of operation target or resource' 21 is modeled into a reference-related operation part 21-1 with an importance of '1'; 'service stop' 22 is modeled into an operation-related operation part 22-1 with an importance of '2'; 'confirmation of service stop' 23 is modeled into a reference-related operation part 23-1 with an importance of '1'; 'server stop' 24 is modeled into an operation-related operation part 24-1 with an importance of '2'; 'server start-up' 25 is modeled into an operation-related operation part 25-1 with an importance of '2'; 'confirmation of server start-up' 26 is modeled into a reference-related operation part 26-1 with an importance of '1'; and 'error notification mail' 27 and are individually modeled into notification-related operation parts 27-1 and 28-1.

When workflow B is modeled, the individual operation parts are changed as follows: 'acquisition of operation target or resource' 31 is modeled into a reference-related operation part 31-1 with an importance of '1'; 'software installation' 32 is modeled into a setting-related operation part 32-1 with an importance of '3'; 'information registration' 33 is modeled into a setting-related operation part 33-1 with an importance of '3'; 'server restart' 34 is modeled into an operation-related operation part 34-1 with an importance of '2'; 'confirmation of server start-up' 35 is modeled into a reference-related operation part 35-1 with an importance of '1'; and 'mail transmission' 36 and 'error notification mail' 37 are individually modeled into notification-related operation parts 36-1 and 37-1.

Subsequently, the exclusive-section initial setting process (step S12 of FIG. 5) is carried out, including the following processing. As described in FIGS. 7A, 7B and 8 below, the exclusive section control unit 110 automatically determines exclusive sections based on (i) the same operation targets and the use of the same variables and (ii) flows of resources (passing of variables) used in individual operation parts. Specifically, to determine an exclusive section, the exclusive section control unit 110 checks whether or not consecutive operation parts have the same operation-target server, or have the same operation-target server and the same operation content (such as a service, and software to be installed). Note that 'A' in the notation of [exclusive section: A] is referred to as the exclusive section name. For example, a section whose operation target is server A is defined by the notation [exclusive section: A]. Similarly, a section whose operation target is server B is defined by the notation [exclusive section: B]. In addition, within [exclusive section: A], a section whose operation content is service X is defined by the notation [exclusive section: A+X]. In [exclusive section: A], a section whose operation content is InstallSoftY is defined by the notation [exclusive section: A+Y]. A section in which output information of an operation part is input to the subsequent operation part is defined by the notation [exclusive section: C].

FIGS. 7A and 7B illustrate processing for determining exclusive sections based on the same operation targets and the use of the same variables. According to FIG. 7A, the operation parts 22-1 and 23-1 have the same operation target, 'server A', and the same service, 'service X'. In this case, the exclusive section control unit 110 determines the operation parts 22-1 and 23-1 as [exclusive section: A+X]. The operation target of the operation part 24-1 is server A. In this case, the exclusive section control unit 110 determines the operation part 24-1 as [exclusive section: A]. The operation target of the operation parts 25-1 and 26-1 is server B. In this case, the exclusive section control unit 110 determines the operation parts 25-1 and 26-1 as [exclusive section: B]. According to FIG. 7B, the exclusive section control unit 110 determines the operation parts 32-1 and 33-1 as [exclusive section: A+Y], and determines the operation parts 34-1 and 35-1 as [exclusive section: A].

Note that the exclusive section control unit 110 may determine exclusive sections based on flows of resources (passing of variables) used in individual operation parts. In this processing, the exclusive section control unit 110 determines a section for exclusive control based on whether an output value of an operation part is used as an input value of the subsequent operation part. For example, in the case where an event log (log information) acquired from a server (referred to as 'server C') is stored in a database server, the exclusive section control unit 110 defines a corresponding section by the notation [exclusive section: C].

Lock contention in each exclusive section occurs if one of the following cases regarding exclusive section names is true:

(i) The exclusive section name of an exclusive section acquiring an exclusive right at least partially matches the exclusive section name of an exclusive section having acquired an exclusive right; and (ii) The exclusive section name of an exclusive section having acquired an exclusive right at least partially matches the exclusive section name of an exclusive section acquiring an exclusive right.

Therefore, the exclusive section control unit 110 determines whether the exclusive section name of an exclusive section acquiring an exclusive right at least partially matches the exclusive section name of an exclusive section having acquired an exclusive right, or whether the exclusive section name of an exclusive section having acquired an exclusive right at least partially matches the exclusive section name of an exclusive section acquiring an exclusive right. If determining that the exclusive section name of an exclusive section acquiring an exclusive right at least partially matches the exclusive section name of an exclusive section having acquired an exclusive right, the exclusive section control unit 110 determines the occurrence of exclusive lock contention. Also if determining that the exclusive section name of an exclusive section having acquired an exclusive right at least partially matches the exclusive section name of an exclusive section acquiring an exclusive right, the exclusive section control unit 110 determines the occurrence of exclusive lock contention.

FIG. 8 illustrates a lock contention relationship of exclusive sections. For example, if the exclusive section having acquired an exclusive right is [exclusive section: A] and the exclusive section acquiring an exclusive right is one of [exclusive section: A], [exclusive section: A+X], and [exclusive section: A+Y], exclusive lock contention occurs. On the other hand, if the exclusive section having acquired an exclusive right is [exclusive section: A] and the exclusive section acquiring an exclusive right is either [exclusive section: B] or [exclusive section: C], extensive lock contention does not take place.

Next explained is the process carried out when a workflow is running. The exclusive-section resetting process (step S13 of FIG. 5) includes the following processing. When a workflow is started, the exclusive section control unit 110 acquires and analyzes the content of the workflow. Then, the exclusive section control unit 110 adjusts and determines exclusive sections of the started workflow based on all operation parts included in the started workflow. The exclusive control unit 100 also adjusts and determines exclusive sections of running workflows based on all operation parts included in the running workflows. Based on the adjustment and determination results, the individual workflow executing units 120 instruct the business servers 210 about the execution of the operation parts.

The following gives a detailed description of the process when a workflow is running (i.e., the exclusive-section resetting process).

(1-1) Details of Acquisition and Analysis of Workflow Content

When a workflow is started, the exclusive section control unit 110 determines the execution priority of the workflow in the following manner. First, the exclusive section control unit 110 acquires information of operation parts defined in the workflow and resources to be used, which information is preliminarily registered in a storage device of the operation automation server 100. Subsequently, based on the information of the resources to be used in the individual operation parts (information of operation targets and content of variables), the exclusive section control unit 110 carries out the same process as step S12 of FIG. 5 once again and, then, carries out exclusive section resetting in the following cases. That is, when, in exclusive sections in each of which a different variable is used as an input, a change is made in such a manner that the variables have the same value, the exclusive section control unit 110 merges the exclusive sections. In addition, when, in an exclusive section set based on the same variable, a change is made to content of the variable, the exclusive section control unit 110 splits the exclusive section.

Figure 9:
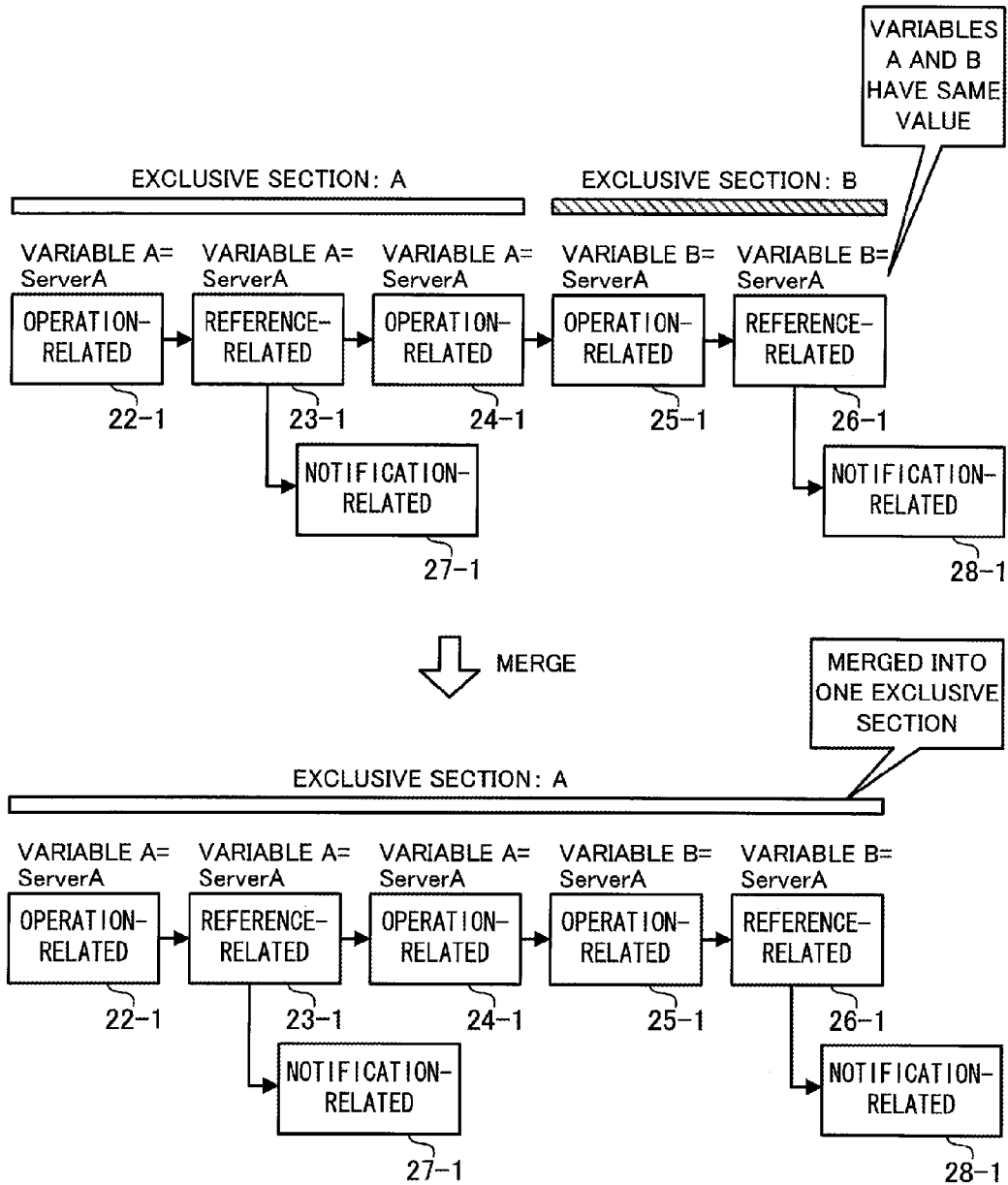
FIG. 9 illustrates an example of merging the exclusive sections.

FIG. 9 illustrates an example of merging exclusive sections. The example of FIG. 9 illustrates the case of merging exclusive sections when, in the exclusive sections set based on different variables, a change is made in such a manner that the variables have the same value. Prior to the mergence of the exclusive sections, the operation parts 22-1 to 24-1 are set as [exclusive section: A] and the operation parts 25-1 and 26-1 are set as [exclusive section: B]. Assume here that the workflow is subsequently executed and a change is made to the value of a variable. As a result of the change, the value of variable A of the operation parts 22-1 to 24-1 is 'ServerA', and the value of variable B of the operation parts 25-1 and 26-1 is also 'ServerA'. In this case, because variable A and variable B in the neighboring [exclusive section: A] and [exclusive section: B] have the same value, the exclusive section control unit 110 merges [exclusive section: A] and [exclusive section: B] into [exclusive section: A].

Figure 10:
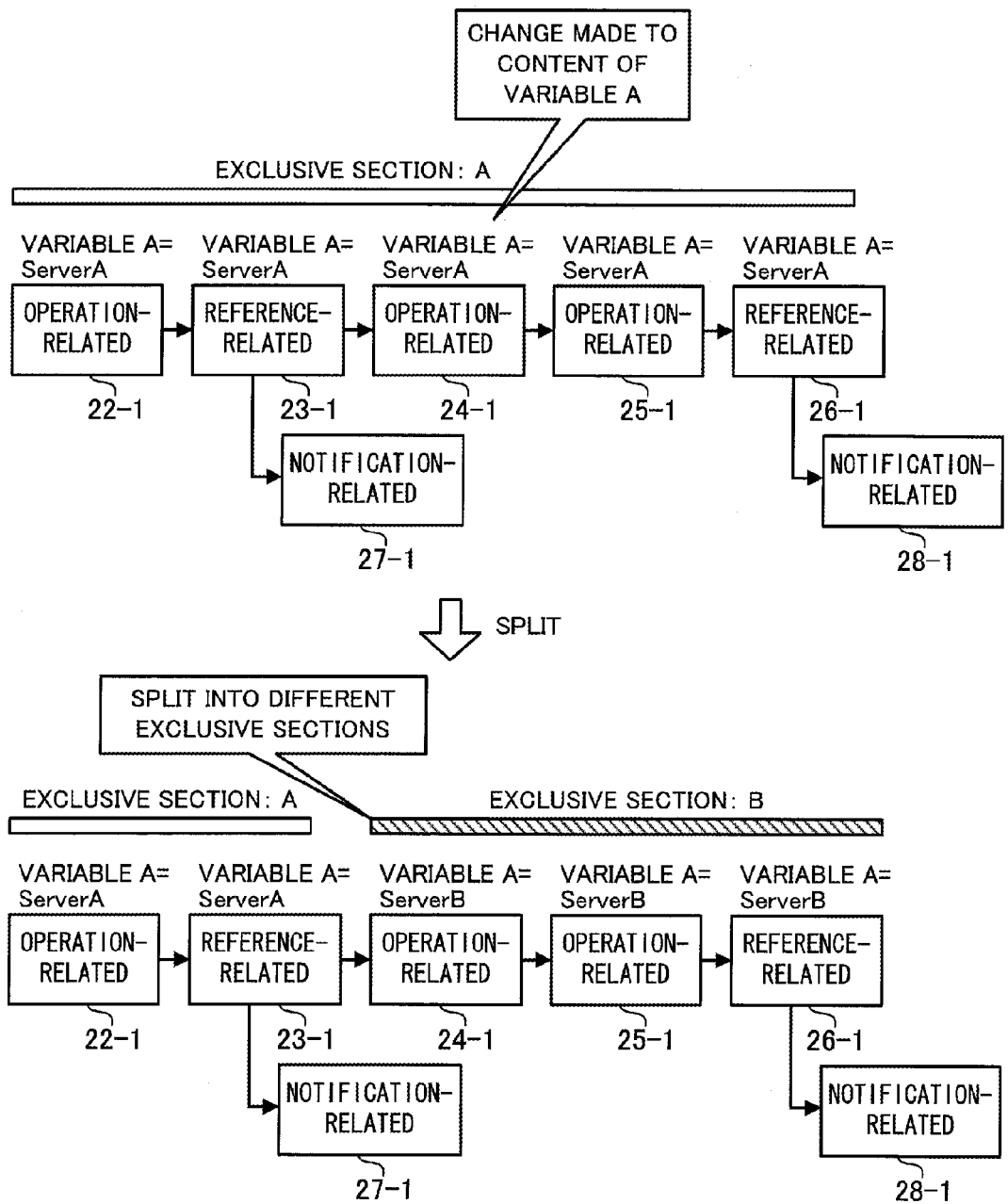
FIG. 10 illustrates an example of splitting an exclusive section.

FIG. 10 illustrates an example of splitting an exclusive section. The example of FIG. 10 illustrates the case of splitting an exclusive section when, in the exclusive section set based on the same variable, change is made to content of the variable. Prior to the split of the exclusive section, the operation parts 22-1 to 26-1 are set as [exclusive section: A]. Assume here that the workflow is subsequently executed and a change is made to a value of the variable. As a result of the change, the value of variable A of the operation parts 22-1 to 23-1 is 'ServerA', and the value of variable A of the operation parts 24-1 and 26-1 is 'ServerB'. In this case, because the operation parts 22-1 and 23-1 and the operation parts 24-1 to 26-1 have different values for variable A, the exclusive section control unit 110 splits [exclusive section: A] into [exclusive section: A] and [exclusive section: B].

Next, according to equation (1) below, the exclusive section control unit 110 determines the degree of the operational urgency of a workflow based on a user having started the workflow, how the workflow has been started, and the remaining time before the scheduled time of completion.

$$\text{Degree of Operational Urgency} = \text{User Coefficient} \times \text{Start-up Method Coefficient} \times \text{Time Coefficient} \quad (1)$$

The user coefficient is a coefficient of a user having started the workflow. For example, an administration user is assigned a user coefficient of 3.0, and a general user is assigned a user coefficient of 2.0. As for the start-up method coefficient, for example, a start-up method coefficient of 2.0 is assigned in the case where the workflow has been started manually. When the workflow has been started on schedule at a specified time, a start-up method coefficient of 3.0 is assigned. Also when the workflow has been started with a notice from a monitoring system, a start-up method coefficient of 3.0 is assigned. As for the time coefficient, for example, a time coefficient of 1.5 is assigned when the remaining time before the scheduled time of completion is 10 minutes or less. In other cases, or in the case where the scheduled time of completion is not specified, a time coefficient of 1.0 is assigned.

Next, the exclusive section control unit 110 provisionally determines the execution priority of the workflow according to equation (2) below.

$$\text{Execution Priority} = \Sigma(\text{Operational Importance}) \times \text{Degree of Operational Urgency} \quad (2)$$

Here, the calculation of the execution priority to be provisionally determined is demonstrated using an example of workflow A in which an operation-related operation part [1] and a reference-related operation part [2] are designated as an exclusive section. Assume here that workflow A is assigned a user coefficient of 2.0, a start-up method coefficient of 1.0, and a time coefficient of 1.5. The operation importance of the operation part [1] is '2' and that of the operation part [2] is '1', and therefore, $\Sigma$ (operational importance) is: 2+1=3. According to equation (1), the degree of the operational urgency is: 2.0×1.0×1.5=3.0. As a result, according to equation (2), the execution priority is: 3×3.0=9.0.

(1-2) Adjustment and Determination of Provisionally Determined Exclusive Section when Workflow is Running Next, the exclusive section control unit 110 adjusts and determines a provisionally determined exclusive section when a workflow is running. When the workflow is running, the exclusive section control unit 110 changes the execution priority according to branches in the workflow and processing results of operation parts. Then, according to the execution priority, the exclusive section control unit 110 determines whether to immediately execute an operation part following a currently executed operation part or keep it wait. The adjustment and determination process is achieved by the following steps (I) to (V).

(I) The exclusive section control unit 110 receives a predetermined notice from the workflow executing unit 120.

(II) The exclusive section control unit 110 carries out the processes described in 'Details of Acquisition and Analysis of Workflow Content' in (1-1) above, to thereby determine exclusive sections and execution priority once again.

(III) The exclusive section control unit 110 stores, in a storage device, the exclusive sections and execution priority re-determined in (II) above.

(IV) The exclusive section control unit 110 extracts, from workflows currently being executed, an exclusive section having the highest execution priority.

(V) The exclusive section control unit 110 determines whether to immediately execute a following operation part of the workflow or keep it wait. At this point, the exclusive section control unit 110 executes the operation part when the workflow has been determined to acquire an exclusive right. On the other hand, when another workflow has acquired an exclusive right in preference, the exclusive section control unit 110 delays the execution of the operation part.

Figure 11:
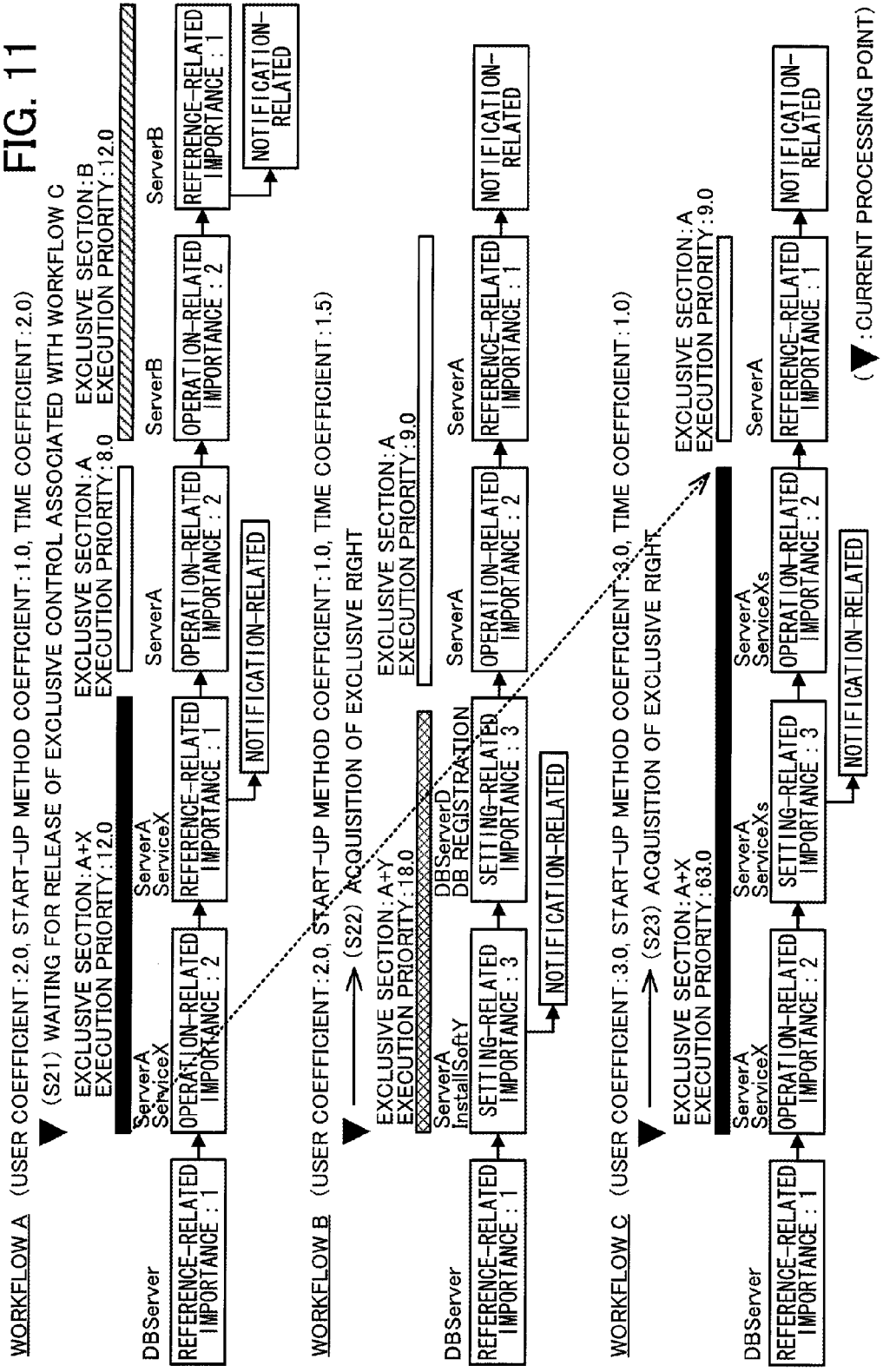
FIG. 11 is a first part illustrating an example of extracting an exclusive section having the highest execution priority and determining a subsequent exclusive section to be executed.
Figure 12:
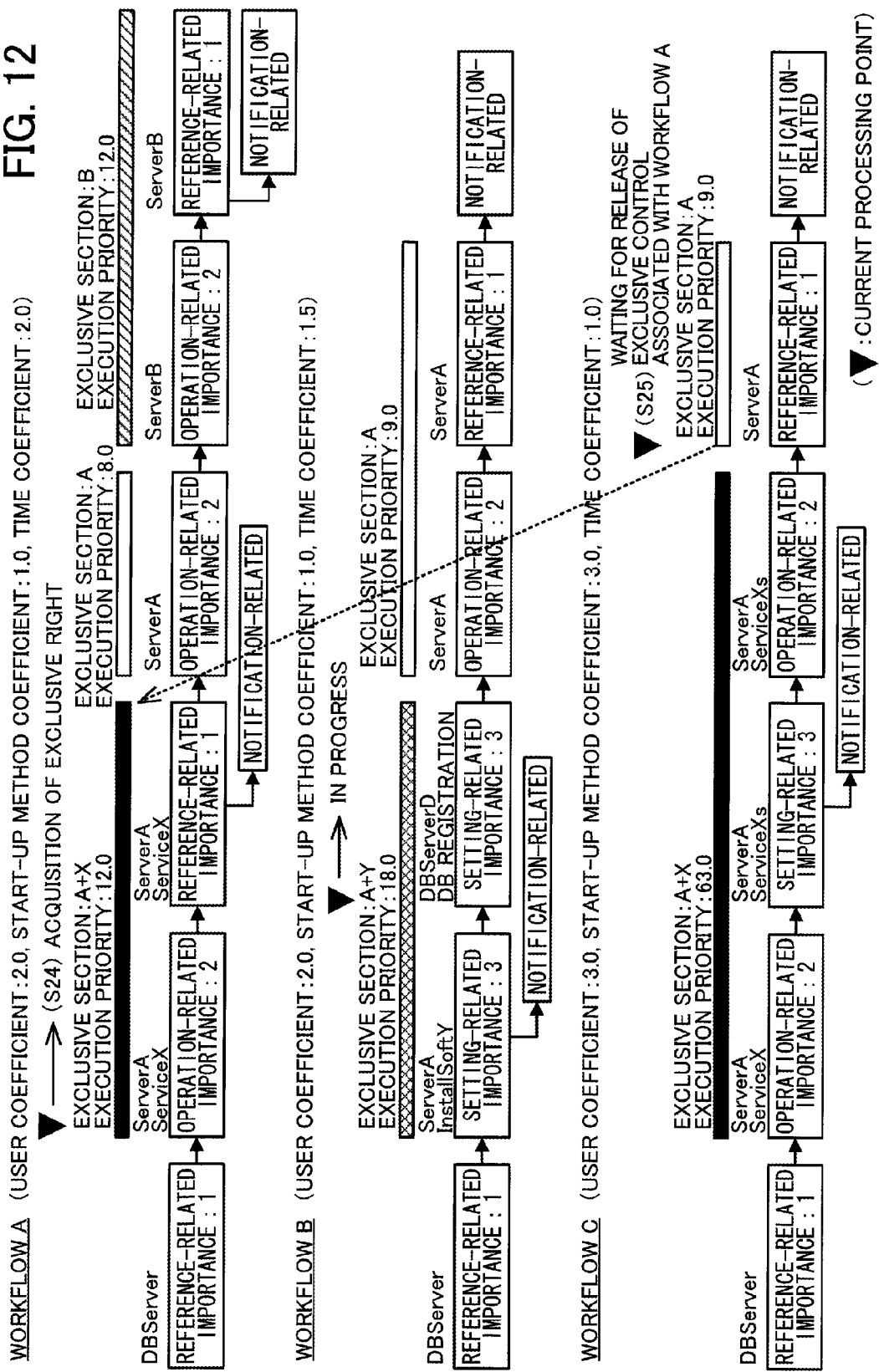
FIG. 12 is a second part illustrating the example of extracting an exclusive section having the highest execution priority and determining a subsequent exclusive section to be executed.

Steps (IV) and (V) above are explained further with reference to FIGS. 11 to 16. FIGS. 11 and 12 individually illustrate an example of extracting an exclusive section having the highest execution priority and determining whether to execute a following operation part. Assume in FIGS. 11 and 12 that workflows A, B, and C are executed in parallel. In each workflow of FIGS. 11 and 12, an inverted triangle indicates a current processing point in the workflow. In addition, while a workflow is holding an exclusive right (execution right), to be described later, the workflow is allowed to execute its operation.

In FIG. 11, when the operation of [exclusive section: A+X] in workflow A is about to be executed, workflow A is placed into a wait state until exclusive control associated with workflow C is released because [exclusive section: A+X] of workflow C has higher execution priority (step S21). Because [exclusive section: A+Y] of workflow B does not conflict with [exclusive section: A+X], workflow B acquires an exclusive right (execution right) (step S22). Because [exclusive section: A+X] of workflow C has the highest execution priority among the exclusive sections of workflows A, B, and C at this point in time, workflow C acquires an exclusive right (execution right) (step S23).

Next, as illustrated in FIG. 12, when the operation of [exclusive section: A+X] in workflow C is completed, the exclusive control associated with [exclusive section: A+X] is released. As a result, workflow A acquires an exclusive right (execution right) (step S24) because [exclusive section: A+X] of workflow A has the highest execution priority. As for [exclusive section: A] of workflow C, workflow C is placed into a wait state until the exclusive control associated with [exclusive section: A+X] of workflow A is released (step S25). Subsequently, when the operation of [exclusive section: A+X] in workflow A is completed, the exclusive control associated with [exclusive section: A+X] is released although no illustration is made in FIG. 12. At this point, if [exclusive section: A] of workflows B and C has the same execution priority, workflow C acquires an exclusive right (execution right) in preference to workflow B because of its administrative privileges (that is, because of having a larger user coefficient).

Figure 13:
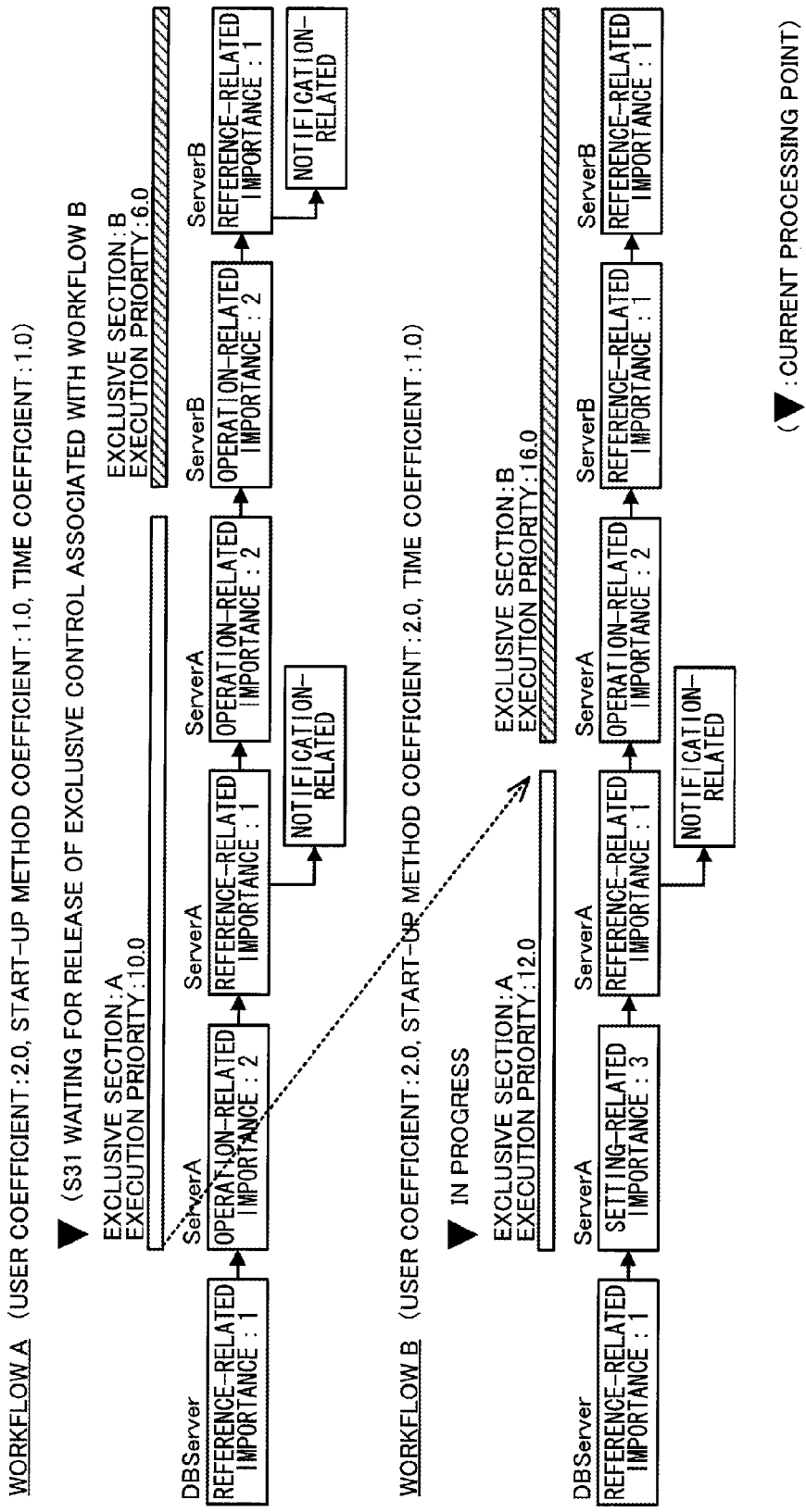
FIG. 13 is a first part illustrating an example of acquisition of an exclusive right (execution right) by a workflow in a case where there is a change in execution priority during execution of workflows.
Figure 14:
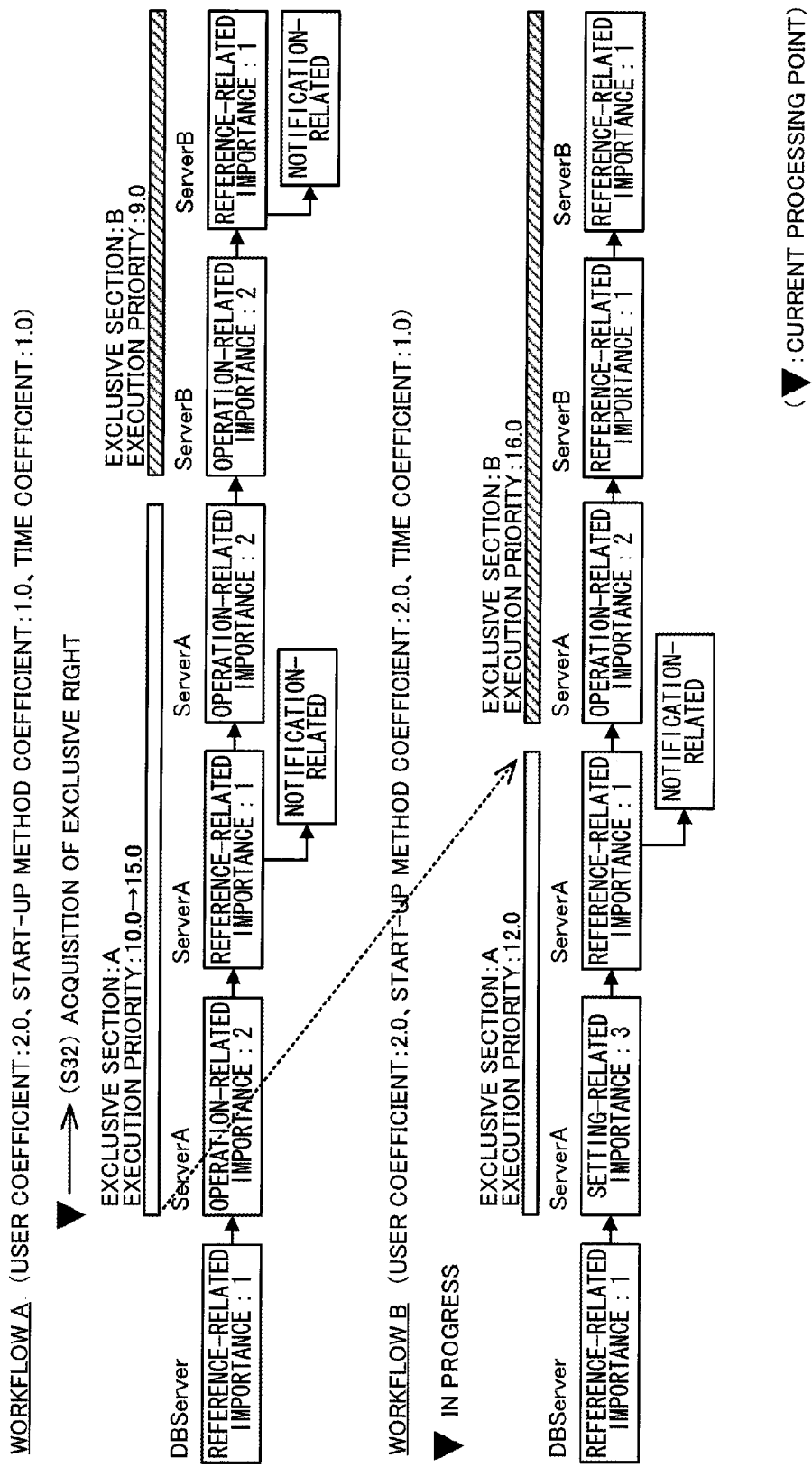
FIG. 14 is a second part illustrating the example of acquisition of an exclusive right (execution right) by a workflow in a case where there is a change in execution priority during execution of workflows.

FIGS. 13 and 14 individually illustrate an example of acquisition of an exclusive right (execution right) by a workflow in the case where there is a change in the execution priority during execution of workflows. As illustrated in FIG. 13, as for [exclusive section: A], when workflow A acquires an exclusive right (execution right), workflow B has yet to acquire an exclusive right (execution right) for [exclusive section: A]. However, workflow B has higher execution priority for [exclusive section: A] than workflow A does, and therefore, workflow A is placed into a wait state (step S31) until workflow B releases exclusive control associated with [exclusive section: A] after acquiring an exclusive right (execution right) for [exclusive section: A] and then carrying out the operation of [exclusive section: A]. Subsequently, the time coefficient changes with time, as illustrated in FIG. 14. As a result, the execution priority of [exclusive section: A] in workflow A is changed. Since the execution priority of [exclusive section: A] of workflow A becomes higher, the workflow A acquires an exclusive right (execution right) and carries out the operation of its [exclusive section: A] (step S32).

As illustrated in FIGS. 11 to 14 above, exclusive sections of individual workflows, which sections use the same resource, are processed sequentially in descending order of the execution priority. If there is a change in the execution priority among the workflows, the execution priority is examined once again, and the operation of an exclusive section having the highest execution priority at that point in time is executed first.

<Rollback Process when Operation is Stopped>

According to the above-described processes, when there are a plurality of workflows including exclusive sections in which operations are carried out on the same resource, an exclusive section having the highest execution priority acquires an exclusive right and the operation of the exclusive section is preferentially executed. On the other hand, the remaining exclusive sections of other workflows are in a process wait state until the operation of the exclusive section with the exclusive right is completed.

However, a failure may occur during the operation of the exclusive section having acquired an exclusive right, and the operation of the exclusive section may not be successfully completed all the way. Or the progress of the operation of the exclusive section having acquired an exclusive right may be considerably delayed. An example of the latter case is when the exclusive section includes a task needing approval from a person and the task remains waiting for the approval for a long time. In such cases, in order to continue the operation of other workflows including exclusive sections, it is needed to stop the operation of the exclusive section having acquired an exclusive right and then transfer the exclusive right to another exclusive section. However, simply stopping the operation of the exclusive section with an exclusive right and then executing the operation of a different exclusive section may lead to another failure in the different exclusive section.

FIG. 15 illustrates an effect on a different exclusive section in the case of stopping the operation of an exclusive section. Assume in FIG. 15 that an operation part 41 included in [exclusive section: A] of workflow A and an operation part 44 included in [exclusive section: A] of workflow B carry out the same operation. In addition, assume that the processing content of an operation part 43 located at the end of [exclusive section: A] of workflow A is a following task corresponding to the operation part 41 coming before the operation part 43 (located at the forefront of [exclusive section: A] according to the example of FIG. 15).

A following task is carried out, for example, to change an operation-target resource to the opposite state from what it is when a corresponding foregoing task is carried out. For example, if the processing content of the operation part 41 is to stop a service, that of the operation part 43, which is the following task of the operation part 41, is to start the service. Executing the operation part 43 enables the service to be placed in a state considered to be appropriate, i.e., a running state, at the time of the execution of the operation of 'stopping the service'. In this manner, it is possible to ensure that, when an operation part (the operation part 44, for example) whose processing content is the same as that of the operation part 41 is executed after the execution of the operation part 43, the service is in a state considered to be appropriate at the time of the execution of the operation part.

In addition, a following task may be a process for ensuring that an operation-target resource operates in a stable manner. Assume, for example, that the operation part 41 is to stop a service, the operation part 43 is to start the service, and the operation part 42 executed between the operation parts 41 and 43 is to change a setting for the service or update a program. In this case, after the service is stopped by the execution of the operation part 41, a setting change or a program update is made by the operation part 42. Subsequently, when the service is started by the execution of the operation part 43, the changed setting information or updated program is applied to the service, enabling the service to operate in a stable manner.

Assuming here that workflow A has acquired an exclusive right for exclusive resource A and then the execution of [exclusive section: A] of workflow A has been started, [exclusive section: A] of workflow B is not executed until the operation of [exclusive section: A] of workflow A is completed. Then, when the entire operation of [exclusive section: A] of workflow A is completed successfully, workflow B acquires an exclusive right for exclusive resource A and the execution of [exclusive section: A] of workflow B is started. In this case, because the following task based on the operation part 43 has been carried out on the operation-target service, the operation-target service is operating normally at the start of the execution of [exclusive section: A] of workflow B. Therefore, the operation of [exclusive section: A] of workflow B is also executed successfully.

On the other hand, assume for example that a failure is determined to have occurred by the execution of the operation part 42 included in [exclusive section: A] of workflow A and then the operation of [exclusive section: A] of workflow A is ended without the execution of the operation part 43. In this case, in order to continue the operation of workflow B, the exclusive right for exclusive resource A needs to be transfer to workflow B. However, if simply transferring the exclusive right to workflow B and then the operation of [exclusive section: A] of workflow B is executed, the operation-target service does not undergo the following task of the operation part 43. As a result, a failure is likely to occur also in the operation of [exclusive section: A] of workflow B.

For example, in the case where the entire operation of [exclusive section: A] of workflow A is completed successfully, the operation-target service is running at the start of [exclusive section: A] of workflow B. On the other hand, in the case where the operation is stopped at the operation part 42 of workflow A, the operation-target service remains in a stopped state when the operation of [exclusive section: A] of workflow B is started. If the exclusive right is transferred to workflow B after the failure occurrence in the operation part 42 and, then, the operation of [exclusive section: A] of workflow B is executed, the operation-target service is already in a stopped state when the operation part 44 for stopping the operation-target service is executed. This may cause a failure in the execution of the operation part 44. In addition, [exclusive section: A] of workflow B is executed while the operation-target service may remain in an unstable state due to the following task operation part 43 being not executed. In this case also, a failure is likely to occur when [exclusive section: A] of workflow B is executed.

In order to avoid this problem, in the case where the operation stops in the middle of an exclusive section, the operation automation server 100 rolls the operation back to the start of the execution section so that the operation-target resource is restored to, at least, its former state just before the start of the failed exclusive section. The rollback to the start of the exclusive section enables the operation-target service to restore its former state prior to the execution of a foregoing task (the operation part 41 in this case) involving the need of a corresponding following task described above. Herewith, the operation-target service is placed in a state considered to be appropriate at the time of the execution of the operation part 41, and also in a state considered to be appropriate at the time of the execution of the operation part 44. It is also said that the operation-target service is restored into a stable state where there is no need to stabilize the operation of the service by a corresponding following task (the operation part 43 in this case). In this manner, it is possible to reduce the probability of failure occurrence in a subsequently executed exclusive section.

The operations of individual exclusive sections each included in a different workflow and operating on the same resource are designed, in principle, in such a manner as to have no influence on one another. This design principle accounts for no failure occurring, for example, even when the execution order of the exclusive sections is changed according to a change in the execution priority, as described above. Therefore, even if the operation of an exclusive section stops, restoring its operation-target resource to a former state just before the execution of the exclusive section reduces the probability of a failure occurring when a different workflow operates on the resource.

Figure 16:
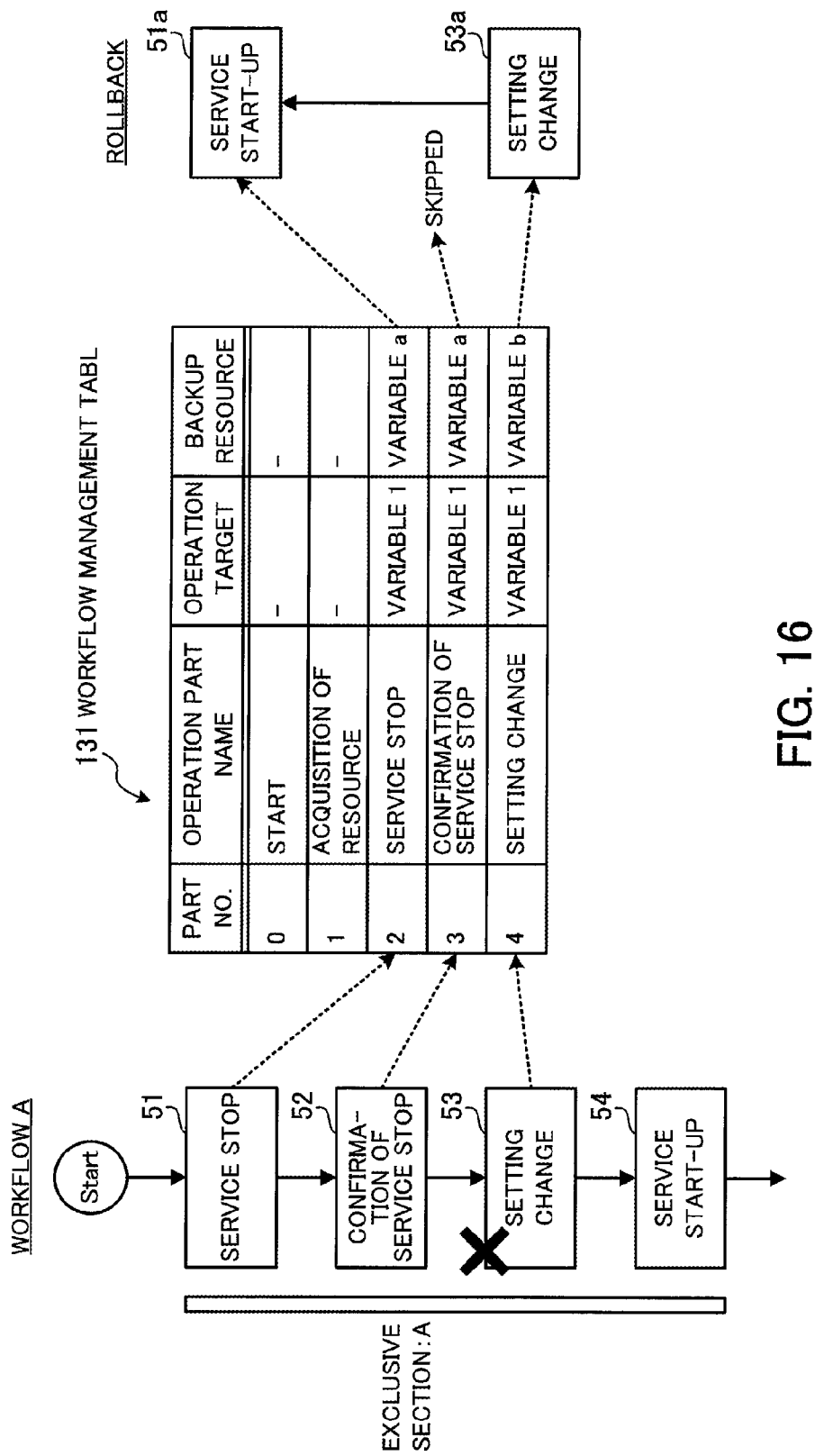
FIG. 16 illustrates procedures of a rollback process.

FIG. 16 illustrates procedures of a rollback process. Basic procedures of the rollback process are described next with reference to FIG. 16. The rollback process is a process that traces executed tasks in reverse and restores an operation-target resource to its former state prior to the execution of the tasks. Implementation of such a rollback process calls for a system to store information indicating a state of the operation-target resource prior to the execution of each task.

According to this embodiment, the content of tasks included in each workflow and the sequence of the tasks are defined in the workflow management table 131. As illustrated in FIG. 16, the workflow management table 131 includes columns for individual data items of 'part number (No.)'; 'operation part name'; 'operation target'; and 'backup resource'. In the part number column, each entry contains the number of an operation part included in a workflow. In the operation part name column, each entry contains the name of a corresponding operation part (operation content). In the operation target column, each entry contains, as an input value, a variable corresponding to the name of an operation-target resource, such as a server and a device. The workflow executing unit 120 corresponding to each workflow executes tasks included in the workflow based on the information defined in the workflow management table 131.

In order to implement the rollback process described above, when executing each task included in a workflow, the workflow executing unit 120 stores, in the workflow management table 131, information indicating the state of the operation-target resource prior to the execution, in association with the task. Specifically, the backup resource column is provided in the workflow management table 131. When executing each operation part, the workflow executing unit 120 stores information about the operation-target resource prior to the execution in a corresponding entry under the column headed 'backup resource'. The information stored in the backup resource column differs depending on the content of a task. In the case where the task is for changing data, for example, 'host name change', data before the change is stored in the backup resource column. In the case of a task for changing a reasonably large volume of data, such as 'file deletion', data before the change is stored in a storage area separately reserved for temporary data (for example, a tmp directory), and information indicating the storage location is stored in the backup resource column. In the case of a task for changing the state of an operation-target resource, such as 'service start-up', information indicating the state of the operation-target resource, acquired from the operation-target resource before the execution of the task, is stored in the backup resource column.

In addition, in order to restore an operation-target resource to its former state prior to the execution of each task, a task different from an original task may be needed. For example, in the case where the original task is 'service stop', 'service start-up' which is an opposite task to the original task needs to be executed in order to restore the service to its former state prior to the execution of the original task. According to this embodiment, the paired parts definition table 140 is provided which stores therein pairs of operation parts each carrying out an opposite task to that of the other paired operation part. In the paired parts definition table 140, the paired operation parts are in association with one another. In the case where a rollback-target operation part has been registered in the paired parts definition table 140, the exclusive section control unit 110 executes an operation part associated with the rollback-target operation part in the paired parts definition table 140. In this manner, it is possible to restore the operation-target resource to its former state prior to the execution of each task.

As for a reference-related task, for example, of reading configured data or confirming the state of a resource, there is no change in the state of a corresponding operation-target resource before and after the task. For this reason, no particular operation is needed in order to restore the operation-target resource to its former state prior to the task. Therefore, in the case where a rollback-target original task is a reference-related task, the workflow executing unit 120 does nothing for the task and moves the rollback target to the next task.

Here, a process of rolling back workflow A illustrated in FIG. 16 is explained as an example. In [exclusive section: A] of workflow A of FIG. 16, the following operation parts are sequentially included: an operation part 51 for stopping a service; an operation part 52 for confirming the stop of the service; an operation part 53 for changing settings of the service; and an operation part 54 for starting the service. Assume here that, after the operation parts 51 and 52 are successfully executed by the workflow executing unit 120, a failure occurs during the execution of the operation part 53 and the execution stops. After recognizing that the execution of the operation part 53 has stopped, the exclusive section control unit 110 rolls back the operation in the order of the operation parts 53, 52, and 51.

In the workflow management table 131, an entry in the backup resource column, corresponding to the operation part 53, contains data prior to the setting change. The exclusive section control unit 110 reads the data prior to the setting change from the workflow management table 131, and executes a setting change operation 53a for resetting the read data on a corresponding operation target. This restores the operation target to its former state prior to the execution of the operation part 53.

Subsequently, the exclusive section control unit 110 does not execute an opposite operation to the operation part 52 because the operation part 52 is a reference-related task. At this point, the operation target has been restored to its former state prior to the execution of the operation part 52. As for the operation part 51 of 'service stop', there is an opposite operation, an operation 51a of 'service start-up'. Therefore, the exclusive section control unit 110 executes the operation 51a of 'service start-up'. This restores the operation target to its former state prior to the execution of the operation part 51, that is, a state in which the service is running.

With the above-described process, rollback for [exclusive section: A] of workflow A is completed, and the operation target is restored to its former state just before the execution of [exclusive section: A] of workflow A.

Figure 17:
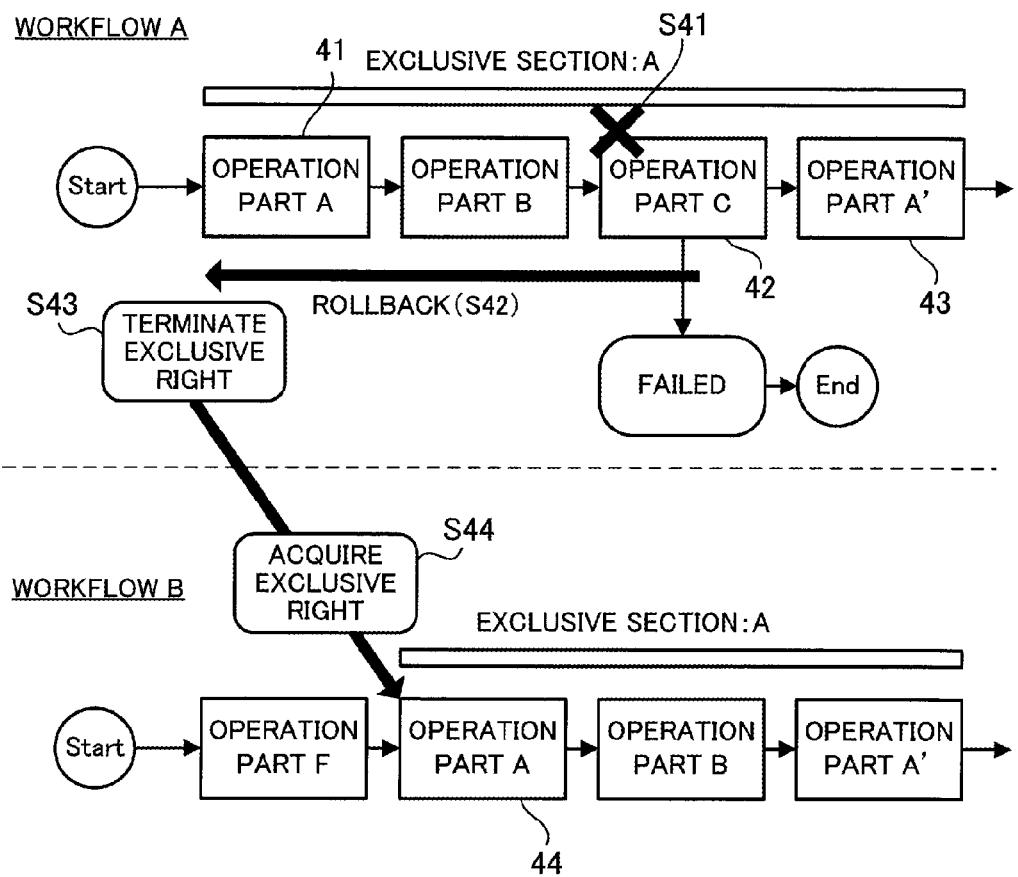
FIG. 17 illustrates an example where execution of a different workflow is resumed due to the rollback process.

FIG. 17 illustrates an example where the execution of a different workflow is resumed due to a rollback process. FIG. 17 uses workflows A and B depicted in FIG. 15. Assume, first, that the operation of [exclusive section: A] of workflow A is being executed. At this point, the operation part 44 located at the forefront of [exclusive section: A] of workflow B is in a state waiting for the exclusive control to be released. Then, assume that a failure occurs in the operation part 42 included in workflow A (step S41).

The exclusive section control unit 110 rolls back workflow A to the beginning of [exclusive section: A] of workflow A (step S42). This restores exclusive resource A to its former state prior to the execution of the operation part 41. When the rollback is completed, the exclusive section control unit 110 terminates the exclusive right for exclusive resource A given to workflow A (step S43). This allows [exclusive section: A] of workflow B to acquire the exclusive right, and the task of the operation part 44 is then started (step S44).

As described above, after the rollback to the beginning of the exclusive section including the failed operation part 42, the different workflow B operating on the same exclusive resource is started. This reduces the probability of failure occurrence during the execution of workflow B.

Next described is another example where the need for rollback arises. Other than the case where the operation of an exclusive section is stopped due to the occurrence of an operation failure as in the example of FIG. 15, there are some cases where it is preferable to stop the operation of an exclusive section and roll back the operation even if an operation failure is not necessarily involved, as in the example of FIG. 18 below.

Figure 18:
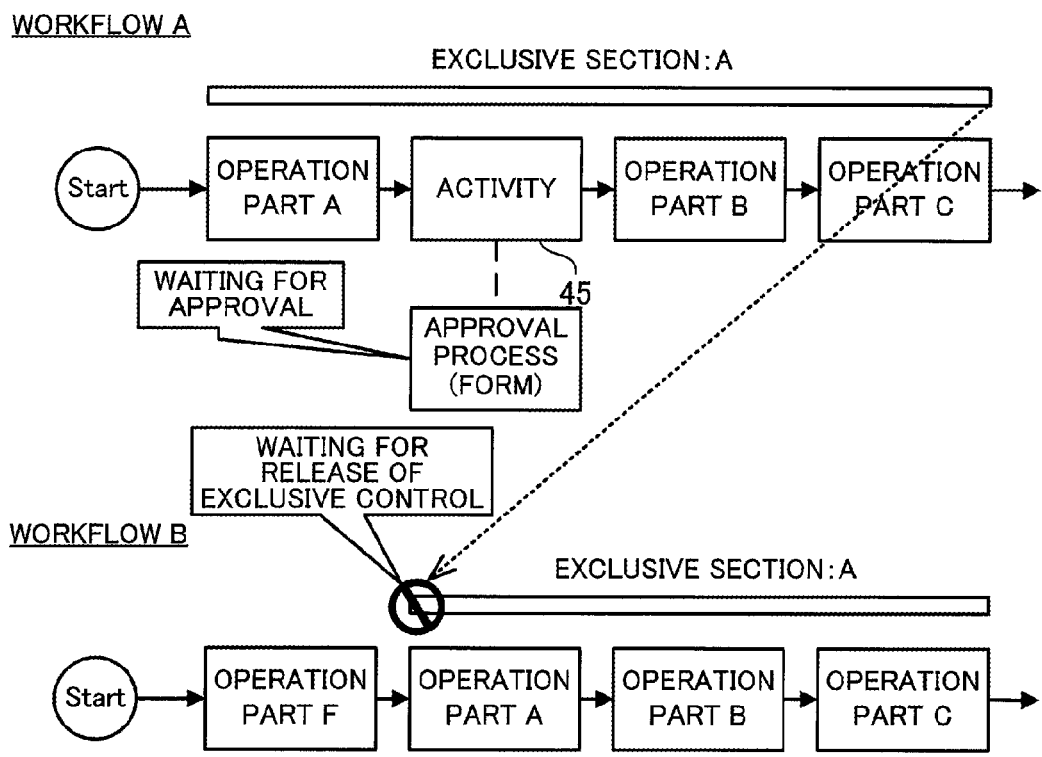
FIG. 18 illustrates a case where an operation of an exclusive section stops progressing due to waiting for approval from a person.

FIG. 18 illustrates a case where the operation of an exclusive section stops progressing due to waiting for approval from a person. Assume in FIG. 18 that [exclusive section: A] of workflow A has acquired an exclusive right before [exclusive section: A] of workflow B. In addition, [exclusive section: A] of workflow A includes an activity 45 involving a process according to an input operation by a person (for example, an approval process). That is, the activity 45 includes a process not allowing the next process to take place without receiving an input operation related to, for example, an approval action. Note that such a process of the activity 45 is also referred to as 'form'.

In such an approval process, a wait state may be held for a long period of time due to no input operation being made by a person. In this case, [exclusive section: A] of workflow B also waits long for the exclusive control to be released. For example, in the case where a data center is run by the operation automation server 100, such a prolonged wait in the activity 45 prevents the operation automation server 100 from operating the data center according to a set schedule.

In view of this, the exclusive section control unit 110 is configured to start counting the time using a timer when detecting that an activity involving a process according to an input operation by a person is executed by the workflow executing unit 120. Then, if the execution of the activity is not completed within a predetermined time frame, the exclusive section control unit 110 determines to stop and roll back the operation. At this point, the exclusive section control unit 110 rolls back the operation to the beginning of an exclusive section including the activity according to the above-described procedure, and then releases the exclusive control associated with a workflow including the exclusive section. Subsequently, the exclusive section control unit 110 transfers the exclusive right to a different workflow, which then proceeds with its operation.

According to the example of FIG. 18, the exclusive section control unit 110 starts timing when the operation of the activity 45 starts, and then stops the operation of the activity 45 if the execution is not completed within a predetermine time frame. After rolling back the operation to the beginning of [exclusive section: A] of workflow A, the exclusive section control unit 110 transfers the exclusive right for exclusive resource A from [exclusive section: A] of workflow A to [exclusive section: A] of workflow B. Herewith, the operation of [exclusive section: A] of workflow B is started.

As for an activity involving a process according to an input operation by a person, in order to allow such an activity to be detected, the activity is defined in the workflow management table 131 in the same manner as operation parts. When executing the activity, the workflow executing unit 120 notifies the exclusive section control unit 110 accordingly. Upon receiving the notification, the exclusive section control unit 110 monitors the timer, and also monitors notification of completion of the activity sent from the workflow executing unit 120.

Figure 19:
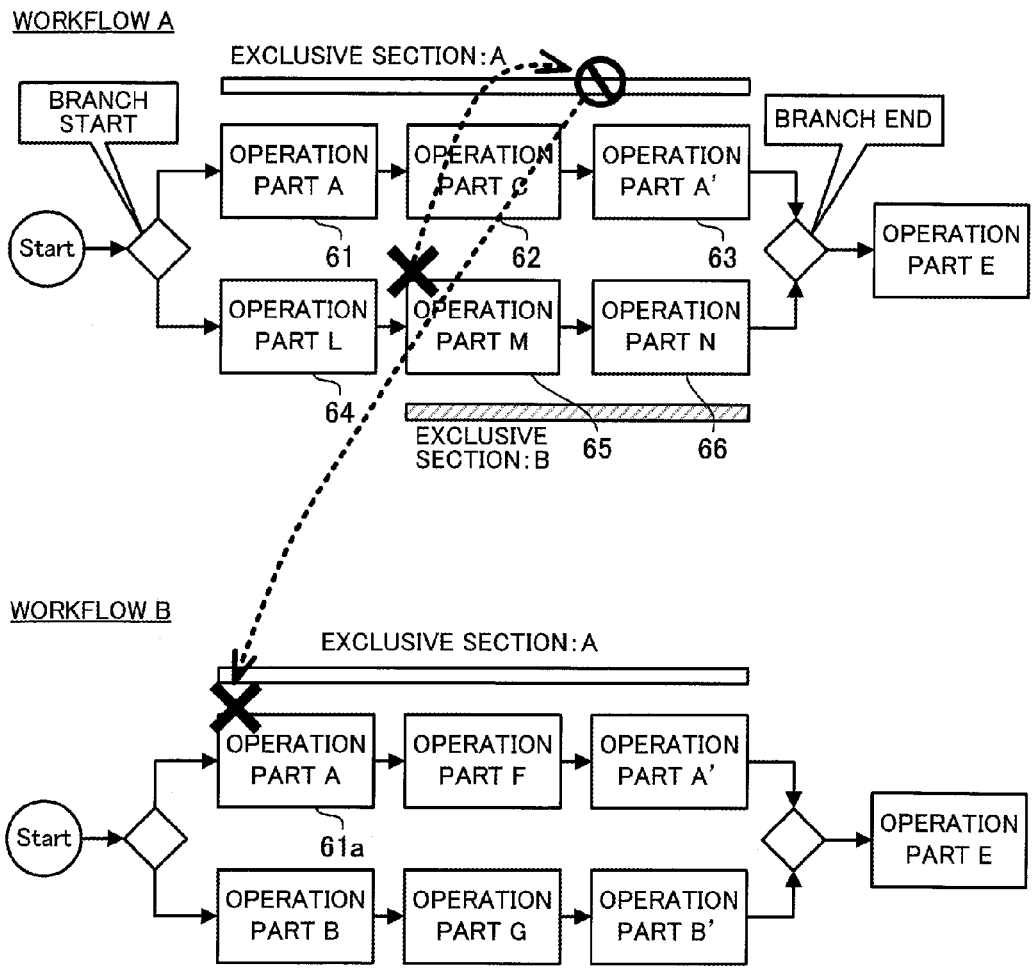
FIG. 19 illustrates a case where a failure has occurred in an operation in a branch after a parallel branch point.

Next described is a rollback process in the case where workflows include parallel branches. FIG. 19 illustrates a case where a failure has occurred in a task in a branch after a parallel branch point. Workflow A on the upper part of FIG. 19 includes parallel branches, one of which includes operation parts 61 to 63 and the other of which includes operation parts 64 to 66. In addition, the operation parts 61 to 63 of the one branch are included in [exclusive section: A] corresponding to exclusive resource A. Among the operation parts 64 to 66 of the other branch, the operation parts 65 and 66 are included in [exclusive section: B] corresponding to exclusive resource B. Workflow B on the lower part of FIG. 19 includes an operation part 61a for carrying out the same operation as that of the operation part 61 of workflow A. In addition, workflow B also includes [exclusive section: A] corresponding to exclusive resource A, and the operation part 61a is included in [exclusive section: A] of workflow B.

Assume here that [exclusive section: A] of workflow A has acquired an exclusive right before [exclusive section: A] of workflow B. Note that [exclusive section: B] of workflow B has also acquired an exclusive right. In this situation, the operation parts 61 to 63 and the operation parts 64 to 66 are executed in parallel. On the other hand, workflow B is put into a wait state before the start of the operation part 61a.

In the case where a workflow includes parallel branches, if a failure occurs in a task of one branch, the operation of the other branch is also stopped because the operation cannot be successfully completed to the end of the parallel branches. For example, when a failure occurs in the task of the operation part 65 in FIG. 19, the operation of the operation parts 61 to 63 is also stopped. In this case, the operation needs to be rolled back to the point before the start of [exclusive section: A] of workflow A, that is, to the starting point of the parallel branches in order to prevent failure occurrence when the operation part 61a of workflow B is executed.

In addition, as for workflow A, in the case where the operation of the one parallel branch is rolled back to the branch starting point, the operation of the other parallel branch also needs to be rolled back to the branch starting point, that is, to the point before the execution of the operation part 64. According to this example, rollback needs to be made not to the beginning of [exclusive section: B] to which the failed operation part 65 belongs, but to a point further back in the operation.

Therefore, in the case where a task in one of parallel branches stops, the exclusive section control unit 110 rolls back the operation to the starting point of the parallel branches regardless of whether the task is included in an exclusive section. Herewith, even when an exclusive section is included in the other parallel branch, the operation is surely rolled back to a point before the start of the exclusive section. This prevents failure occurrence when a different workflow operates on an exclusive resource corresponding to the exclusive section.

As mentioned above, the rollback process is a process that traces executed tasks in reverse and restores an operation-target resource to its former state prior to the execution of the tasks. However, the operation-target resource may not be restored to its former state prior to the execution of the tasks by simply tracing the executed tasks. This is the case when the execution of an operation part has been omitted.

Figure 20:
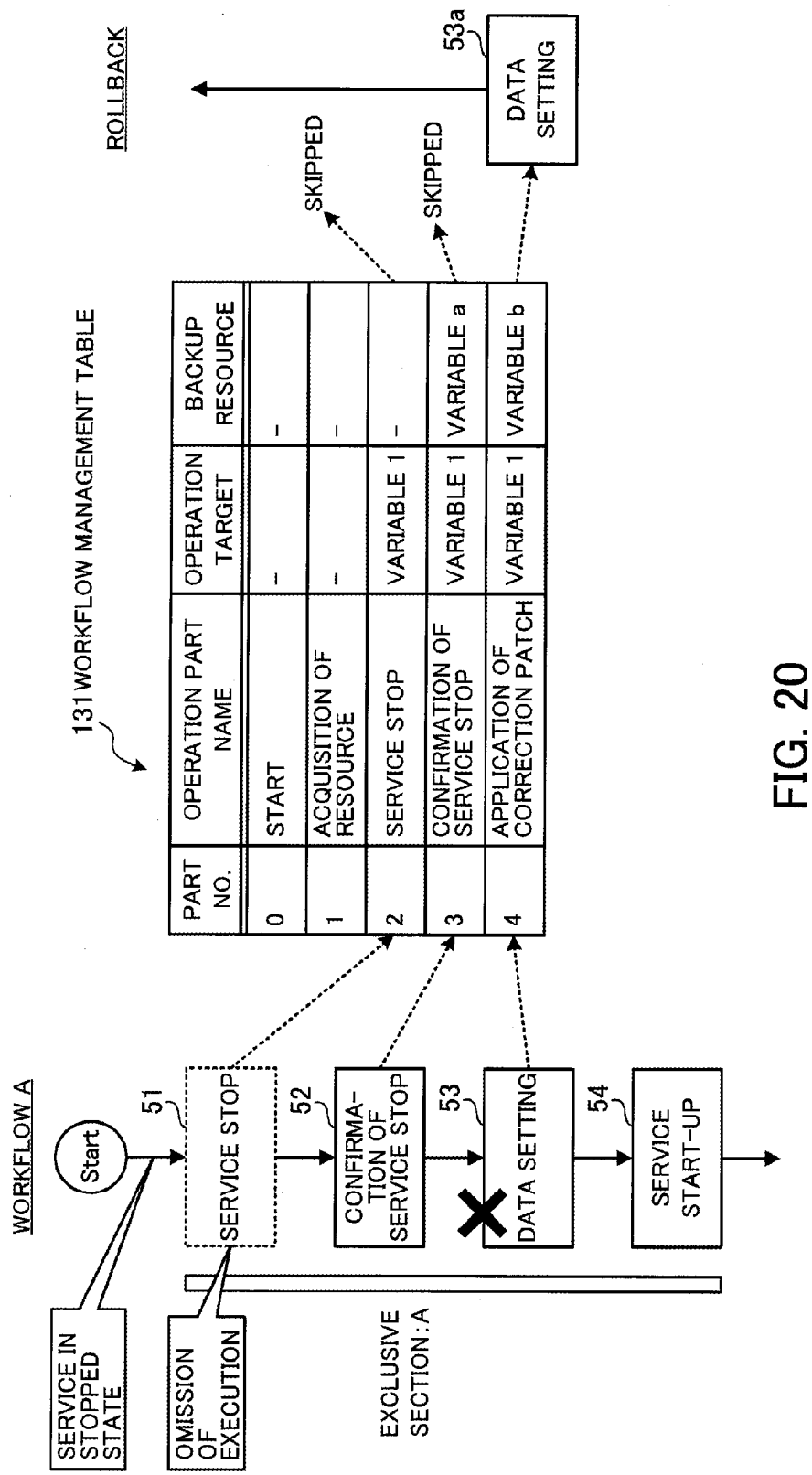
FIG. 20 illustrates the rollback process in a case where execution of an operation part is omitted.

FIG. 20 illustrates a rollback process in the case where execution of an operation part is omitted. In [exclusive section: A] of workflow A of FIG. 20, the following operation parts are included as in the case of FIG. 16: the operation part 51 for stopping a service; the operation part 52 for confirming the stop of the service; the operation part 53 for changing settings of the service; and the operation part 54 for starting the service.

Assume here that an operation-target service prior to the execution of the operation part 51 is in a stopped state. In this case, since there is no point in executing the operation part 51, the workflow executing unit 120 may omit the execution of the operation part 51. Subsequently, if a failure occurs in the task of the operation part 53, the operation needs to be rolled back to the task of the operation part 51. At this point, if the task 'starting the service' is executed as a task corresponding to the operation part 51 as illustrated in FIG. 16, the service is running after the execution. Thus, the service is put in a different state from the state prior to the execution of the operation part 51.

In view of this, when omitting the execution of an operation part, the workflow executing unit 120 stores, in a storage device, information indicating that the execution is omitted. Herewith, the exclusive section control unit 110 recognizes the omission of the execution of the operation part by making reference to the stored information when rollback is executed, and then carries out no task for the operation part and moves the rollback target to the next task.

According to this embodiment, when omitting the execution of an operation part, the workflow executing unit 120 stores, in the workflow management table 131, no information in a corresponding entry under the column headed 'backup resource'. According to the example of FIG. 20, the exclusive section control unit 110 sets no information in an entry under the column headed 'backup resource', corresponding to the operation part 51. When the operation part 51 becomes a target of the rollback process, the exclusive section control unit 110 makes reference to the workflow management table 131 and recognizes the omission of the execution of the operation part 51 because no information is set in the corresponding entry under the column headed 'backup resource'. In this case, the exclusive section control unit 110 carries out no task in relation to the operation part 51. In this manner, as a result of the rollback process, the operation-target service is restored to 'service in a stopped state', that is, its former state prior to [exclusive section: A] of workflow A.

Next described are examples of information tables used in the processing of the operation automation server 100.

FIG. 21 illustrates an example of a workflow management table. The workflow management table 131 is used to manage operation parts included in individual workflows and generated when the workflows are registered. The workflow management table 131 includes a column for a data item of 'workflow number'. In the workflow number column, each entry contains a number for identifying a workflow. The workflow management table 131 also includes columns for individual data items of 'part number'; 'operation part name'; 'operation target'; 'operation service or resource'; 'backup resource'; 'output'; and 'next part number'. In the workflow management table 131, each record containing entries of these columns is associated with a corresponding 'workflow number'. Note that, in the following description, a record corresponding to one 'part number' is referred to as simply 'record of the workflow management table 131'.

In the part number column, each entry contains the number of an operation part included in a corresponding workflow. In the operation part name column, each entry contains the name of a corresponding operation part (operation content). In the operation target column, each entry contains, as an input value, a variable corresponding to the name of an operation-target server, device, or the like. In the operation service or resource column, each entry contains, as an input value, a variable corresponding to the name of a service or resource to be operated. In the backup resource column, each entry contains information indicating the state of a corresponding operation-target resource prior to the execution of a corresponding operation part. Content of the information is as explained in FIG. 16. Note that the information is stored in the backup resource column before the execution of the corresponding operation part. In the output column, each entry contains a variable to which an output value is assigned. In the next part number column, each entry contains a number indicating an operation part to be executed next in a corresponding workflow.

In the workflow management table 131 described above, records are also provided individually for each activity involving a process according to an input operation by a person, and for each start and for each end of parallel branches. Then, a name of the activity (operation content), and information indicating the start or the end of parallel branches are individually registered in entries under the column headed 'operation part name', corresponding to the provided records. Herewith, in the case where a task included in a workflow is an activity involving a process according to an input operation by a person, the exclusive section control unit 110 is able to recognize such an activity when the activity in the workflow is executed. In addition, in a rollback process, the exclusive section control unit 110 is able to recognize a starting point of parallel branches.

FIG. 22 illustrates an example of an operation part definition table. The operation part definition table 132 pre-stores therein definition information of operation parts. The operation part definition table 132 includes columns for individual data items of 'operation part name'; 'part type'; 'operation/confirmation target'; and 'operational importance'.

In the operation part name column, each entry contains the name of an operation part (operation content). In the part type column, each entry contains the type of a corresponding operation part. Operation parts are classified into, for example, the following types: operation-related; confirmation-related; notification-related; and setting-related. In the operation/confirmation target column, each entry contains an operation target or confirmation target of a corresponding operation part. In the operational importance column, each entry contains operational importance of a corresponding operation part.

Figure 23:
FIG. 23 illustrates an example of a variable management table.

FIG. 23 illustrates an example of a variable management table. The variable management table 133 is a table for managing variable names and variable values used by instances which are information identifying entities of defined workflow information. The variable management table 133 includes columns for individual data items of 'instance number'; 'workflow number'; 'variable name'; and 'variable value'. In the instance number column, each entry contains a number for identifying an instance. In the workflow number column, each entry contains a number for identifying a workflow. In the variable name column, each entry contains a variable name. In the variable value column, each entry contains a value set for a corresponding variable.

FIG. 24 illustrates an example of an instance management table. The instance management table 134 stores therein information managed for each instance. The instance management table 134 includes columns for individual data items of 'instance number'; 'workflow number'; 'part number (currently being executed)'; 'host name'; 'service name'; 'user identifier (ID)'; 'start-up method coefficient'; 'exclusive section number'; and 'scheduled time of completion'.

In the instance number column, each entry contains a number for identifying an instance. In the workflow number column, each entry contains a number for identifying a workflow. In the part number (currently being executed) column, each entry contains a number for identifying, within a corresponding workflow, an operation part corresponding to the current processing point. In the host name column, each entry contains the name of a host. In the service name column, each entry contains the name of a service. In the user identifier column, each entry contains information for identifying a user (user identifier). In the start-up method coefficient column, each entry contains a start-up method coefficient. In the exclusive section number column, each entry contains a number for identifying an exclusive section. In the scheduled time of completion column, each entry contains a scheduled time for completing a corresponding workflow.

FIG. 25 illustrates an example of an exclusive section management table. The exclusive section management table 135 is a table for managing information of exclusive sections. The exclusive section management table 135 includes columns for individual data items of 'exclusive section number'; 'part number (lock start)'; 'part number (lock release)'; 'execution priority'; and 'operational urgency'. In the exclusive section number column, each entry contains a number for identifying an exclusive section. In the part number (lock start) column, each entry contains a number for identifying the first operation part of a corresponding exclusive section. In the part number (lock release) column, each entry contains a number for identifying the last operation part of a corresponding exclusive section. In the execution priority column, each entry contains a degree of execution priority of a corresponding exclusive section. In the operational urgency column, each entry contains a degree of operational urgency of a corresponding exclusive section.

FIG. 26 illustrates an example of an exclusive right acquisition history table. The exclusive right acquisition history table 136 manages information on exclusive right (execution right) acquisition history of exclusive sections. The exclusive right acquisition history table 136 includes columns for individual data items of 'instance number';

'workflow number'; 'exclusive section number'; 'start-waiting time'; 'start time'; and 'completion time'.

In the instance number column, each entry contains a number for identifying an instance. In the workflow number column, each entry contains a number for identifying a workflow. In the exclusive section number column, each entry contains a number for identifying an exclusive section. In the start-waiting time column, each entry contains a waiting time until a corresponding exclusive section acquires an exclusive right (execution right). In the start time column, each entry contains a time when a corresponding exclusive section acquires an exclusive right (execution right). In the completion time column, each entry contains a completion time of the operation of a corresponding exclusive section after the exclusive section acquires an exclusive right (execution right) and executes the operation.

Figure 27:
FIG. 27 illustrates an example of a user coefficient table.

FIG. 27 illustrates an example of a user coefficient table. The user coefficient table 137 pre-stores therein user coefficients for individual users. The user coefficient table 137 includes columns for individual data items of 'user identifier' and 'user coefficient'. In the user identifier column, each entry contains information for identifying a user (user identifier). In the user coefficient column, each entry contains a user coefficient of a corresponding user identifier.

FIG. 28 illustrates an example of a start-up method coefficient table. The start-up method coefficient table 138 pre-stores therein start-up method coefficients for individual start-up methods. The start-up method coefficient table 138 includes columns for individual data items of 'start-up method' and 'start-up method coefficient'. In the start-up method column, each entry contains a workflow start-up method. In the start-up method coefficient column, each entry contains a coefficient of a corresponding start-up method.

Figure 29:
FIG. 29 illustrates an example of a time coefficient table.

FIG. 29 illustrates an example of a time coefficient table. The time coefficient table 139 pre-stores therein time coefficients for individual periods of time. The time coefficient table 139 includes columns for individual data items of 'remaining time' and 'time coefficient'. In the remaining time column, each entry contains remaining time until a scheduled time of completion. In the time coefficient column, each entry contains a time coefficient of corresponding remaining time.

FIG. 30 illustrates an example of a paired parts definition table. The paired parts definition table 140 pre-stores therein individual operation parts in association with corresponding operation parts to be executed in the rollback process. The paired parts definition table 140 includes columns for individual data items of 'Go' and 'Back', each of which is provided with columns for individual data items of 'operation part' and 'option'.

In the operation part column, each entry contains the name of an operation part (operation content). In the option column, each entry contains a variable assignable to a corresponding operation part. A plurality of entries in the option column may be associated with each operation part. Operation content of each operation part registered in the Back column is the opposite to that of a corresponding operation part registered in the Go column. In the case where a rollback-target operation part has been registered in the Go column in the paired parts definition table 140, the exclusive section control unit 110 executes an operation part registered in the Back column, in association with the rollback-target operation part.

Next described is processing of the operation automation server 100 with reference to flowcharts.

Figure 31:
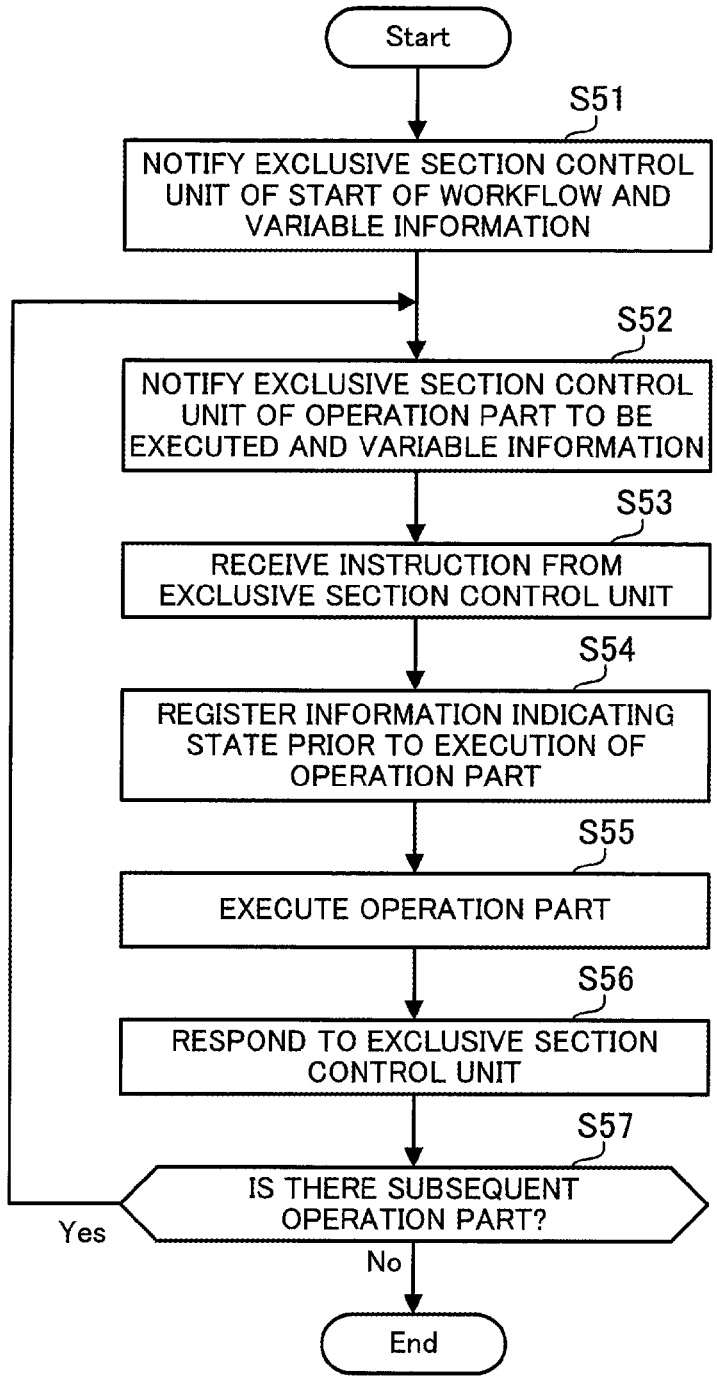
FIG. 31 is a flowchart illustrating an example of a process carried out by a workflow executing unit.

FIG. 31 is a flowchart illustrating an example of a process carried out by a workflow executing unit. The process of FIG. 31 is carried out for each workflow by the workflow executing unit 120 corresponding to the workflow.

[Step S51] When starting the operation of the workflow, the workflow executing unit 120 notifies the exclusive section control unit 110 of the start of the workflow and information of variables to be used in the execution of the workflow. The information of variables includes, for example, a user identifier of a user who has started the workflow and a workflow start-up method.

[Step S52] The workflow executing unit 120 selects, from the workflow management table 131, one record associated with the workflow. Based on the selected record, the workflow executing unit 120 determines an operation part to be executed next, and then notifies the exclusive section control unit 110 of start of the execution of the operation part. Specifically, the workflow executing unit 120 notifies the exclusive section control unit 110 of the identification number of the operation part to be executed and information of variables to be used by the operation part. After notifying the exclusive section control unit 110 of these items, the workflow executing unit 120 enters a state waiting for an instruction from the exclusive section control unit 110.

In step S52, an activity or information indicating the start or end of parallel branches may be registered in the operation part name column. In such a case also, the exclusive section control unit 110 is notified of information indicating content of the operation (for example, an identification number) and information of variables used in the operation, as in the case above.

[Step S53] The workflow executing unit 120 receives an instruction from the exclusive section control unit 110. The workflow executing unit 120 determines content of the instruction and carries out an operation according to the instruction content. Normally, notification indicating continuation of the processing (Action) is output from the exclusive section control unit 110, and the workflow executing unit 120 executes the processing from step S54 onward according to the reception of the Action. Note that until the Action is output from the exclusive section control unit 110, the workflow executing unit 120 remains in a process wait state.

[Step S54] The workflow executing unit 120 registers, in the workflow management table 131, information indicating the state of an operation-target resource prior to the execution of the operation part. More specifically, the information is registered in an entry of the record selected in step S52 under the column headed 'backup resource' in the workflow management table 131.

[Step S55] The workflow executing unit 120 causes the business server 210 to execute an operation part defined in the record selected in step S52.

[Step S56] The workflow executing unit 120 notifies the exclusive section control unit 110 of response information indicating whether the operation has been completed successfully.

Note that, if the operation part defined in the selected record is a start or end of parallel branches, no particular operation is executed in step S55.

When causing the business server 210 to execute the defined operation part, the workflow executing unit 120 determines, based on the state of the operation-target resource before the execution, whether the execution of the defined operation part may be omitted. If omission of the execution of the defined task is possible, the workflow executing unit 120 skips the information registration in the backup resource column in step S54, then executes no particular operation in step S55, and notifies the exclusive section control unit 110 of the completion of the operation in step S56. Note that the exclusive section control unit 110 may determine whether the defined operation part may be omitted. In this case, the workflow executing unit 120 receives, in step S53, an instruction of whether to execute the defined operation part or omit the execution from the exclusive section control unit 110.

[Step S57] Based on the workflow management table 131, the workflow executing unit 120 determines whether a subsequent operation part has been registered in the workflow. This determination is made based on whether there is an unselected record corresponding to the workflow. If there is a subsequent operation part, the processing starting from step S52 is executed for the operation part. On the other hand, if there is no subsequent operation part, the workflow executing unit 120 notifies the exclusive section control unit 110 of the completion of the workflow and then ends the processing.

Figure 32:
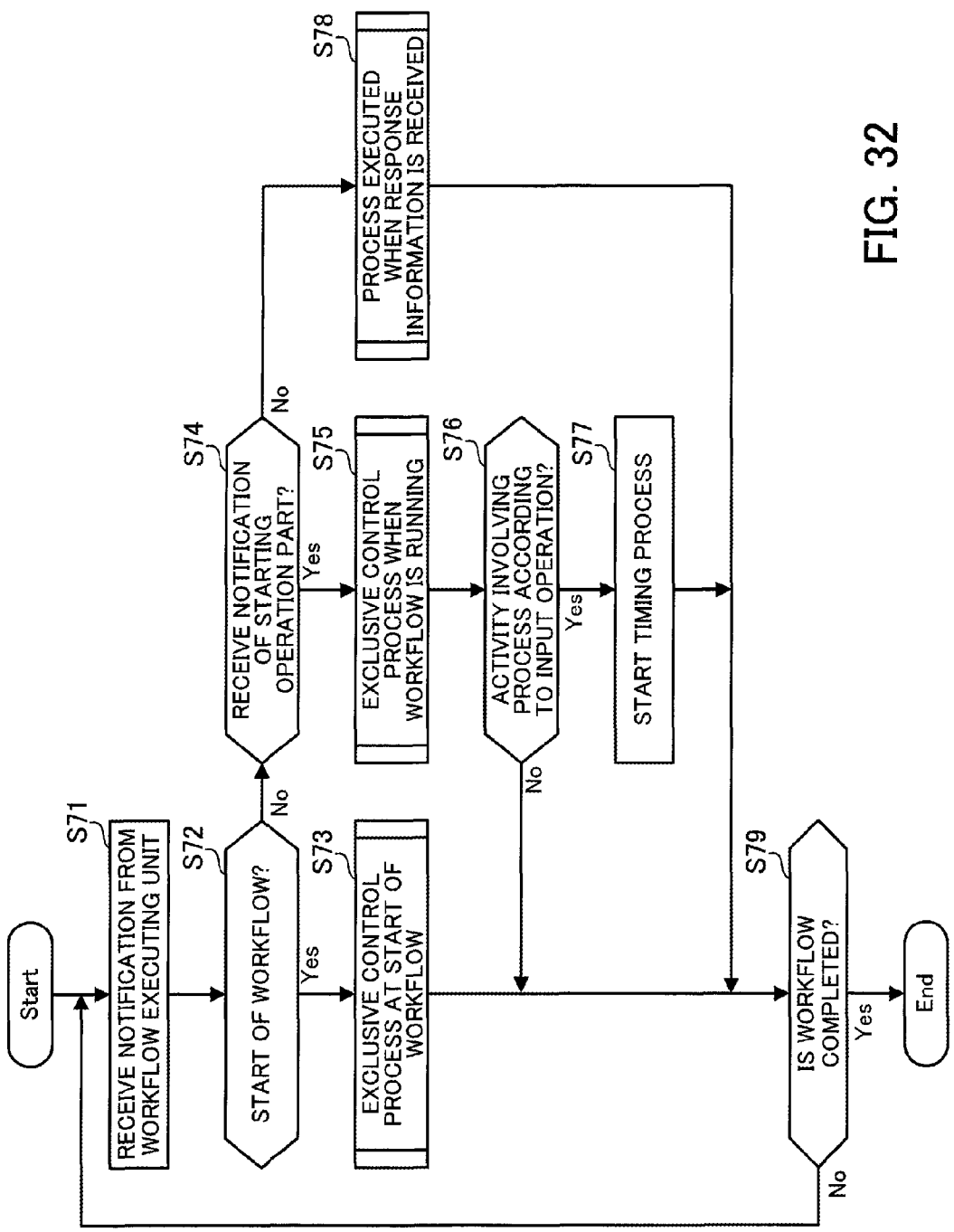
FIG. 32 is a flowchart illustrating an example of a process carried out by an exclusive control unit.

FIG. 32 is a flowchart illustrating an example of a process carried out by an exclusive control unit. The process of FIG. 32 is carried out for each workflow.

[Step S71] The exclusive section control unit 110 waits for notification sent from the workflow executing unit 120. When the exclusive section control unit 110 receives notification from the workflow executing unit 120, the subsequent step S72 is executed.

[Step S72] If the notification received by the exclusive section control unit 110 in step S71 is the notification of the start of a workflow output in step S51 of FIG. 31, the process moves to step S73. In the notification is other kind of notification, the process moves to step S74.

[Step S73] The exclusive section control unit 110 executes an exclusive control process at the start of a workflow. Details of the process are described in FIG. 33.

[Step S74] If the notification received by the exclusive section control unit 110 is the notification output in step S52 of FIG. 31, indicating the start of an operation part included in the workflow, the process moves to step S75. On the other hand, if the received notification is the response information output in step S56 of FIG. 31 in relation to an operation part included in the workflow, the process moves to step S78.

[Step S75] The exclusive section control unit 110 executes an exclusive control process when a workflow is running. Details of the process are described in FIG. 36.

[Step S76] The exclusive section control unit 110 determines whether the operation part, the start of which is notified in step S74, is an activity involving a process according to an input operation. When the operation part is such an activity, the process moves to step S77. On the other hand, when the operation part is not such an activity, the process moves to step S79.

[Step S77] The exclusive section control unit 110 starts a timing process for determining whether the activity is completed within a predetermined time frame. Note that the timing process started in this step is explained in FIG. 38.

[Step S78] The exclusive section control unit 110 executes a process upon receiving the response information. Details of the process are described in FIG. 39.

[Step S79] If the workflow has yet to be completed, the process returns to step S71. On the other hand, if the workflow is completed, the exclusive section control unit 110 ends the process for the workflow. Completion of the workflow is determined by receiving the notification of the completion of the workflow, output in step S57 of FIG. 31.

Figure 33:
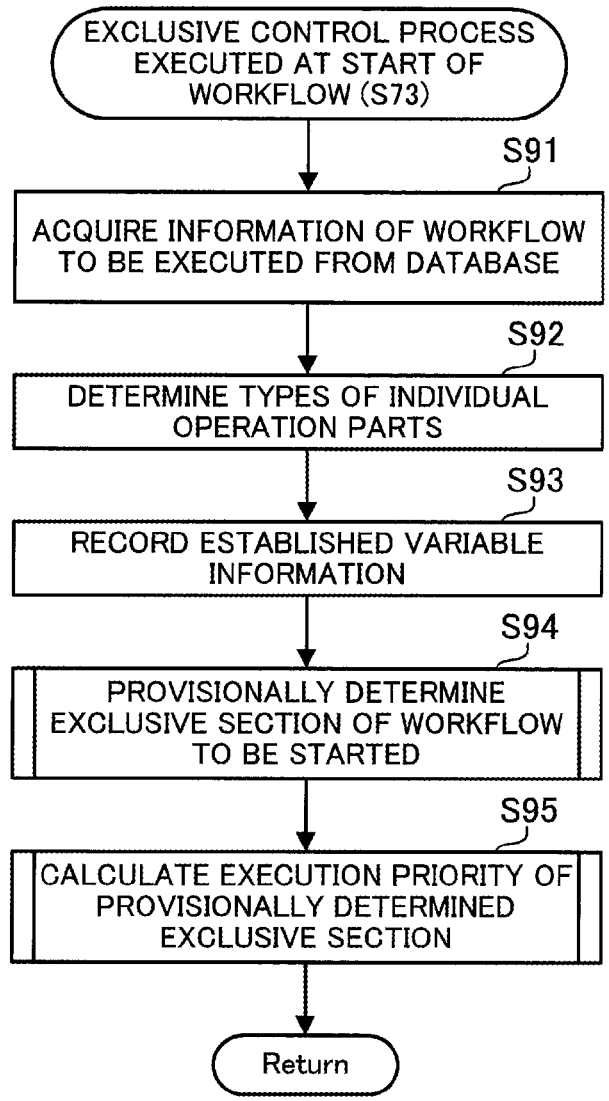
FIG. 33 is a flowchart illustrating an example of an exclusive control process performed at a start of a workflow.

FIG. 33 is a flowchart illustrating an example of the exclusive control process performed at the start of a workflow. The process of FIG. 33 corresponds to step S73 of FIG. 32.

[Step S91] The exclusive section control unit 110 acquires, from the workflow management table 131, information of an execution-target workflow (i.e., the workflow, the execution start of which is notified in step S71 of FIG. 32).

[Step S92] The exclusive section control unit 110 acquires, from the operation part definition table 132, 'part types' corresponding to 'operation part names' included in the execution-target workflow information. Herewith, the exclusive section control unit 110 determines types of operation parts included in the execution-target workflow information.

[Step S93] The exclusive section control unit 110 records, in the variable management table 133, variable information already established at the start of the workflow. The variable information already established at the start of the workflow is, for example, variables to which values are assigned in advance and variables supplied by the workflow executing unit 120.

[Step S94] The exclusive section control unit 110 provisionally determines an exclusive section of the workflow to be started. Details of the process are described in FIG. 34.

[Step S95] The exclusive section control unit 110 calculates execution priority of the provisionally determined exclusive section. Details of the process are described in FIG. 35.

Figure 34:
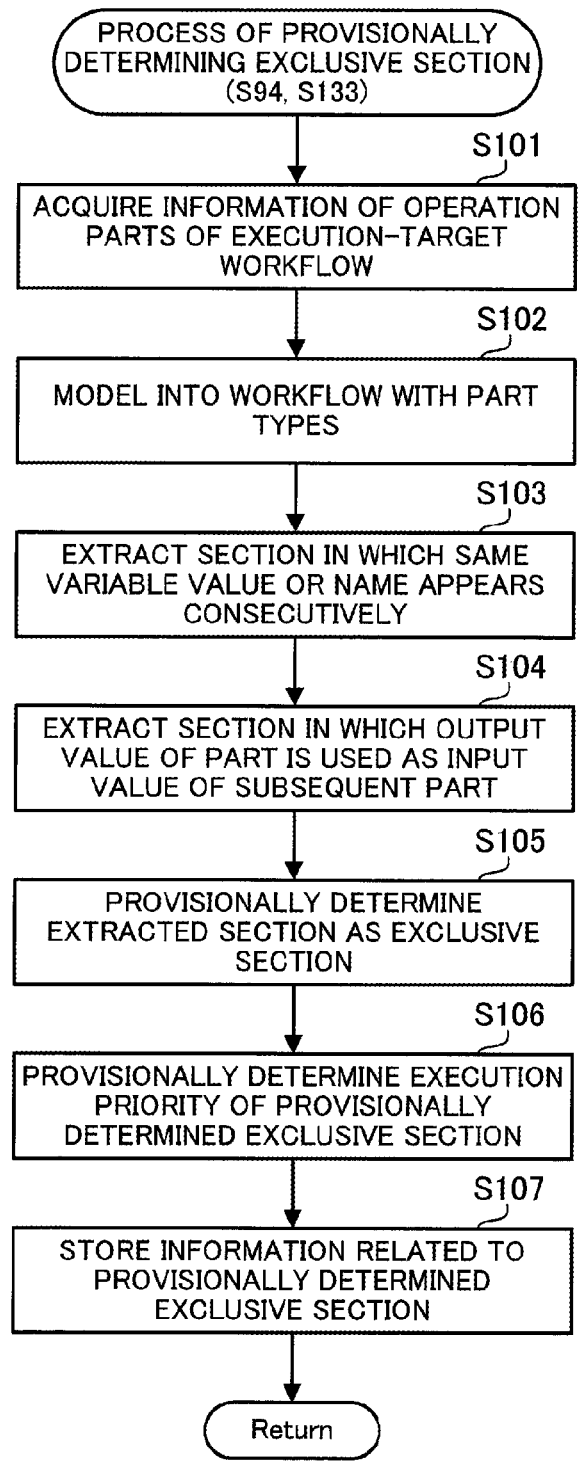
FIG. 34 is a flowchart illustrating an example of a process of provisionally determining an exclusive section.

FIG. 34 is a flowchart illustrating an example of a process of provisionally determining an exclusive section. The process of FIG. 34 corresponds to each of step S94 of FIG. 33 and step S133 of FIG. 36 to be described later.

[Step S101] The exclusive control unit 101 acquires, from the workflow management table 131, information of operation parts included in the execution-target workflow.

[Step S102] The exclusive section control unit 110 models the operation parts of the execution-target workflow based on the operation part definition table 132. That is, based on the operation part definition table 132, the exclusive section control unit 110 converts the operation parts of the execution-target workflow into corresponding part types.

[Step S103] Using the workflow management table 131 and the variable management table 133, the exclusive section control unit 110 extracts consecutive operation parts having the same variable value or variable name from the execution-target workflow. That is, based on entries in the part number column and the subsequent part number column of the workflow management table 131, the exclusive section control unit 110 determines the operation order of the part types (modeled operation parts) of the execution-target workflow. Then, based on the variable management table 133, the exclusive section control unit 110 determines whether the same variable value or variable name appears in consecutive operation parts in the operation order. As a result, the exclusive section control unit 110 extracts, from the workflow management table 131, a section of consecutive operation parts having the same variable value or the same variable name in the operation order.

[Step S104] Using the data items under the columns headed 'operation target', 'operation service or resource', and 'output' in the workflow management table 131, the exclusive section control unit 110 extracts, according to the operation order, a section in which an output value (execution result) of an operation part is used as an input value of the subsequent operation part.

[Step S105] The exclusive section control unit 110 provisionally determines the section extracted in step S103 or S104 as an exclusive section.

[Step S106] The exclusive section control unit 110 provisionally determines execution priority of the provisionally determined exclusive section based on the operation part definition table 132, the user coefficient table 137, the start-up method coefficient table 138, and the time coefficient table 139.

That is, the exclusive section control unit 110 acquires, from the operation part definition table 132, operational importance corresponding to the individual part types included in the provisionally determined exclusive section, and sums the operational importance. In addition, the exclusive section control unit 110 acquires, from the user coefficient table 137, a user coefficient corresponding to a user ID of a user who has started the workflow. The exclusive section control unit 110 also acquires, from the start-up method coefficient table 138, a start-up method coefficient corresponding to a start-up method of the workflow.

Further, the exclusive section control unit 110 calculates the remaining time until a scheduled time of completion of the workflow by subtracting the current time from the scheduled time of completion. At this point, the exclusive section control unit 110 may calculate the scheduled time of completion of the workflow based on preliminarily registered time needed for completion of each operation part. Alternatively, the exclusive section control unit 110 may use completion time acquired from history information of workflows executed in the past (for example, the exclusive right acquisition history table 136) as the scheduled time of completion. The exclusive section control unit 110 acquires, from the time coefficient table 139, a time coefficient corresponding to the calculated remaining time. Subsequently, the exclusive section control unit 110 calculates the operational urgency using equation (1) above, and then calculates the execution priority using equation (2) above.

[Step S107] The exclusive section control unit 110 stores, in the instance management table 134 and the exclusive section management table 135, information related to the provisionally determined exclusive section (i.e., information used in steps S103 to S106, including the provisionally determined exclusive section, the execution priority, the user coefficient, the start-up method coefficient, and the operational urgency).

Figure 35:
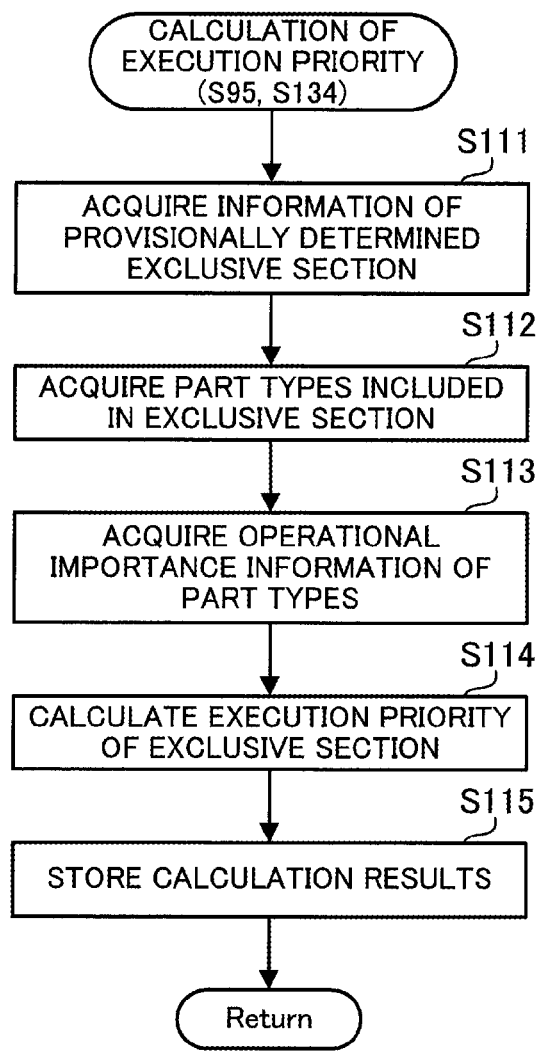
FIG. 35 is a flowchart illustrating an example of a process of calculating execution priority of the exclusive section.

FIG. 35 is a flowchart illustrating an example of a process of calculating execution priority of an exclusive section. The process of FIG. 35 corresponds to each of step S95 of FIG. 33 and step S134 of FIG. 36 to be described later.

[Step S111] The exclusive section control unit 110 acquires, from the instance management table 134 and the user coefficient table 137, information related to the provisionally determined exclusive section (such as a user coefficient, a start-up method coefficient, an exclusive section number, and a scheduled time of completion).

[Step S112] The exclusive section control unit 110 acquires, from the operation part definition table 132, part types included in an exclusive section corresponding to the exclusive section number.

[Step S113] The exclusive section control unit 110 acquires, from the operation part definition table 132, information of operational importance included in the exclusive section corresponding to the exclusive section number.

Note that the operation order of steps S112 and S113 may be reversed.

[Step S114] The exclusive section control unit 110 calculates remaining time until the scheduled time of completion by subtracting the current time from the scheduled time of completion acquired in step S111, and then acquires a time coefficient corresponding to the calculated remaining time from the time coefficient table 139. The exclusive section control unit 110 calculates the operational urgency using equation (1) above, and then calculates the execution priority using equation (2) above.

[Step S115] The exclusive section control unit 110 stores the calculated operational urgency and execution priority in the exclusive section management table 135.

Figure 36:
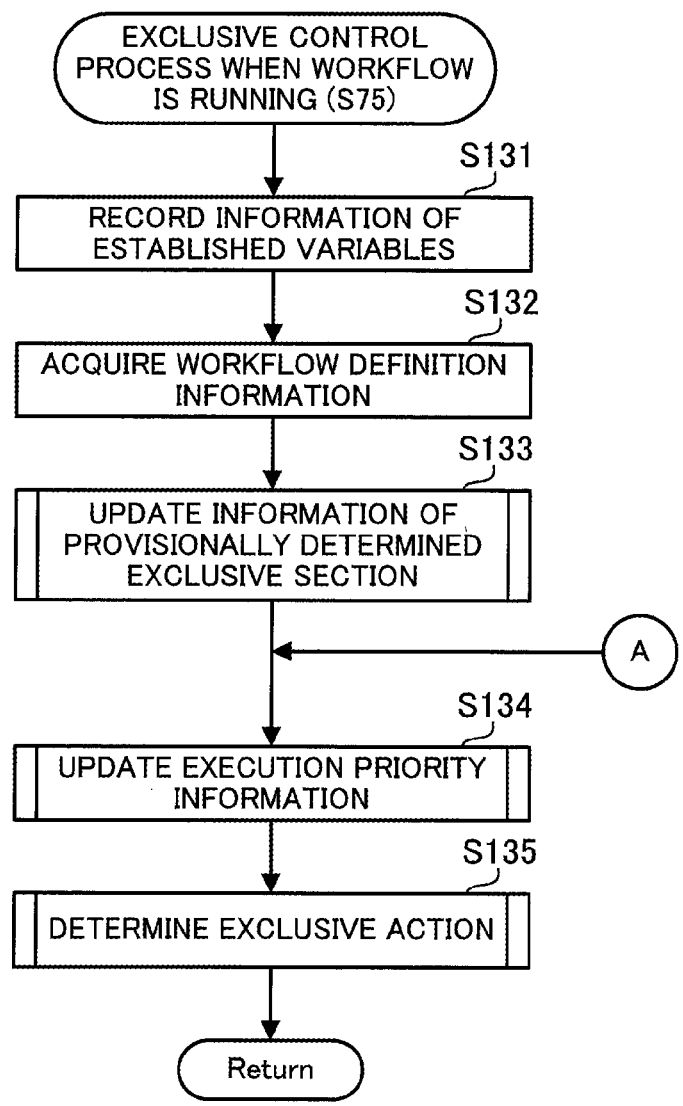
FIG. 36 is a flowchart illustrating an example of the exclusive control process performed when a workflow is running.

FIG. 36 is a flowchart illustrating an example of the exclusive control process performed when a workflow is running. The process of FIG. 36 corresponds to step S75 of FIG. 32.

[Step S131] The exclusive section control unit 110 stores, in the variable management table 133, information of variables included in information notified by the workflow executing unit 120 (i.e., information of established variables) or variables whose values have been assigned in advance.

[Step S132] The exclusive section control unit 110 acquires workflow definition information from the instance management table 134.

[Step S133] The exclusive section control unit 110 updates information of the provisionally determined exclusive section. Details of the processing of step S133 are the same as in FIG. 34.

[Step S134] The exclusive section control unit 110 updates the execution priority information. Details of the processing of step S134 are the same as in FIG. 35.

[Step S135] The exclusive section control unit 110 determines an exclusive action operation. Details of this process are described in FIG. 37.

Figure 37:
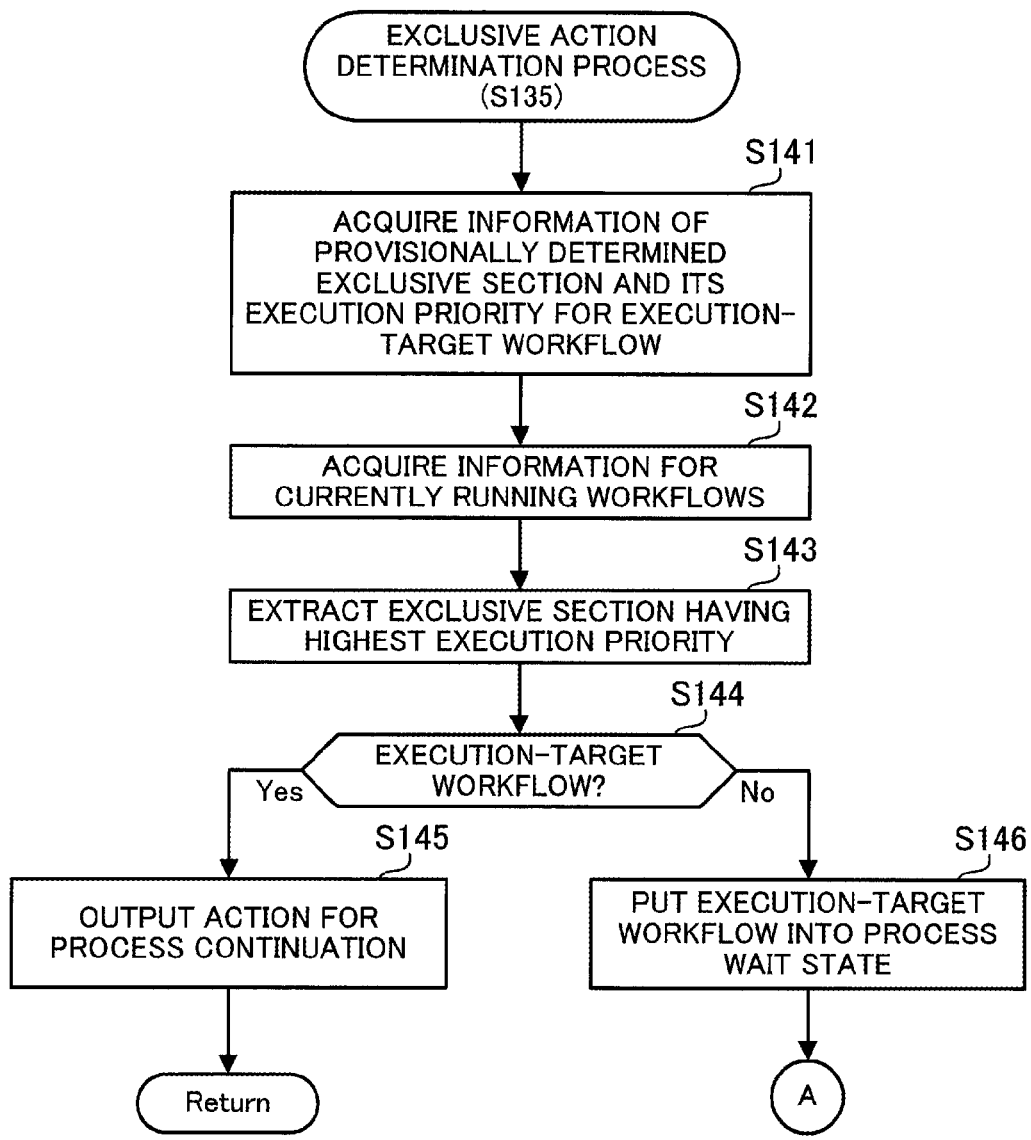
FIG. 37 is a flowchart illustrating an example of an exclusive action determination process.

FIG. 37 is a flowchart illustrating an example of an exclusive action determination process. The process of FIG. 37 corresponds to step S135 of FIG. 36.

[Step S141] With respect to the execution-target workflow, the exclusive section control unit 110 acquires information of the provisionally determined exclusive section and execution priority information. At this point, the exclusive section control unit 110 acquires, from the instance management table 134, information related to the provisionally determined exclusive section of the execution-target workflow (such as an exclusive section number). The exclusive section control unit 110 acquires the execution priority from the exclusive section management table 135 using the exclusive section number as a key.

[Step S142] With respect to workflows currently running, the exclusive section control unit 110 acquires execution state of the workflows, information of a currently executed exclusive section and corresponding execution priority information, and information of scheduled provisionally-determined exclusive sections and corresponding execution priority information. At this point, the exclusive section control unit 110 loads the instance management table 134 to thereby acquire the execution state of the workflows.

As for the currently running workflows (except for the execution-target workflow, execution start of which is notified in step S71 of FIG. 32), the exclusive section control unit 110 acquires the information of the currently executed exclusive section from the instance management table 134 and the exclusive section management table 135. Specifically, the exclusive section control unit 110 first determines a currently targeted operation part (current processing point) in each of the workflows by referring to a corresponding entry under the column headed 'part number (currently being executed)' in the instance management table 134.

Next, based on the instance management table 134 and the workflow management table 131, the exclusive section control unit 110 determines which exclusive section the operation part (current processing point) is included in. The exclusive section control unit 110 acquires the execution priority from the exclusive section management table 135 using an exclusive section number of the determined exclusive section as a key.

[Step S143] As for the currently running workflows (except for the execution-target workflow, execution start of which is notified in step S71 of FIG. 32), the exclusive section control unit 110 acquires information of provisionally determined exclusive sections from the instance management table 134 and the exclusive section management table 135. Specifically, the exclusive section control unit 110 first acquires, from the instance management table 134, information of exclusive sections other than exclusive sections to which the currently targeted operation parts (current processing points) in the workflows belong. Next, the exclusive section control unit 110 acquires corresponding execution priority from the exclusive section management table 135 using exclusive section numbers of the exclusive sections as keys. The exclusive section control unit 110 extracts an exclusive section having the highest execution priority from all exclusive sections included in the execution-target workflow and the workflows whose information is acquired in step S142.

[Step S144] If a workflow to which the exclusive section extracted in step S143 belongs is the execution-target workflow, the execution start of which is notified in step S71 of FIG. 32, the process moves to step S145. On the other hand, if the extracted workflow is not the execution-target workflow, the process moves to step S146.

[Step S145] The exclusive section control unit 110 outputs notification, called Action, indicting continuation of the operation of the execution-target workflow to the workflow executing unit 120 corresponding to the execution-target workflow.

[Step S146] The exclusive section control unit 110 does not output an Action to the workflow executing unit 120, to thereby put the execution-target workflow into a process wait state. After this, step S134 of FIG. 36 is carried out once again and then step S135 (that is, the process of FIG. 37) is carried out. Until, in step S144 of FIG. 37, the workflow to which the exclusive section extracted in step S143 belongs is determined to be the execution-target workflow, the corresponding workflow executing unit 120 is put into a process wait state and steps S134 and S135 are repeated.

Note that, in step S146, the process of step S134 of FIG. 36 may be carried out when the exclusive right given to the exclusive section extracted in step S143 is terminated.

Note that, in steps S145 and S146, the exclusive section control unit 110 newly registers or updates information in the exclusive right acquisition history table 136 as needed basis. For example, if an exclusive section acquires an exclusive right and the operation of the exclusive section is completed, the exclusive section control unit 110 updates information corresponding to the exclusive section in the completion time column. In addition, if an exclusive section including a currently targeted operation part is in a state waiting for exclusive control to be released, the exclusive section control unit 110 updates information corresponding to the exclusive section in the start-waiting time column.

Figure 38:
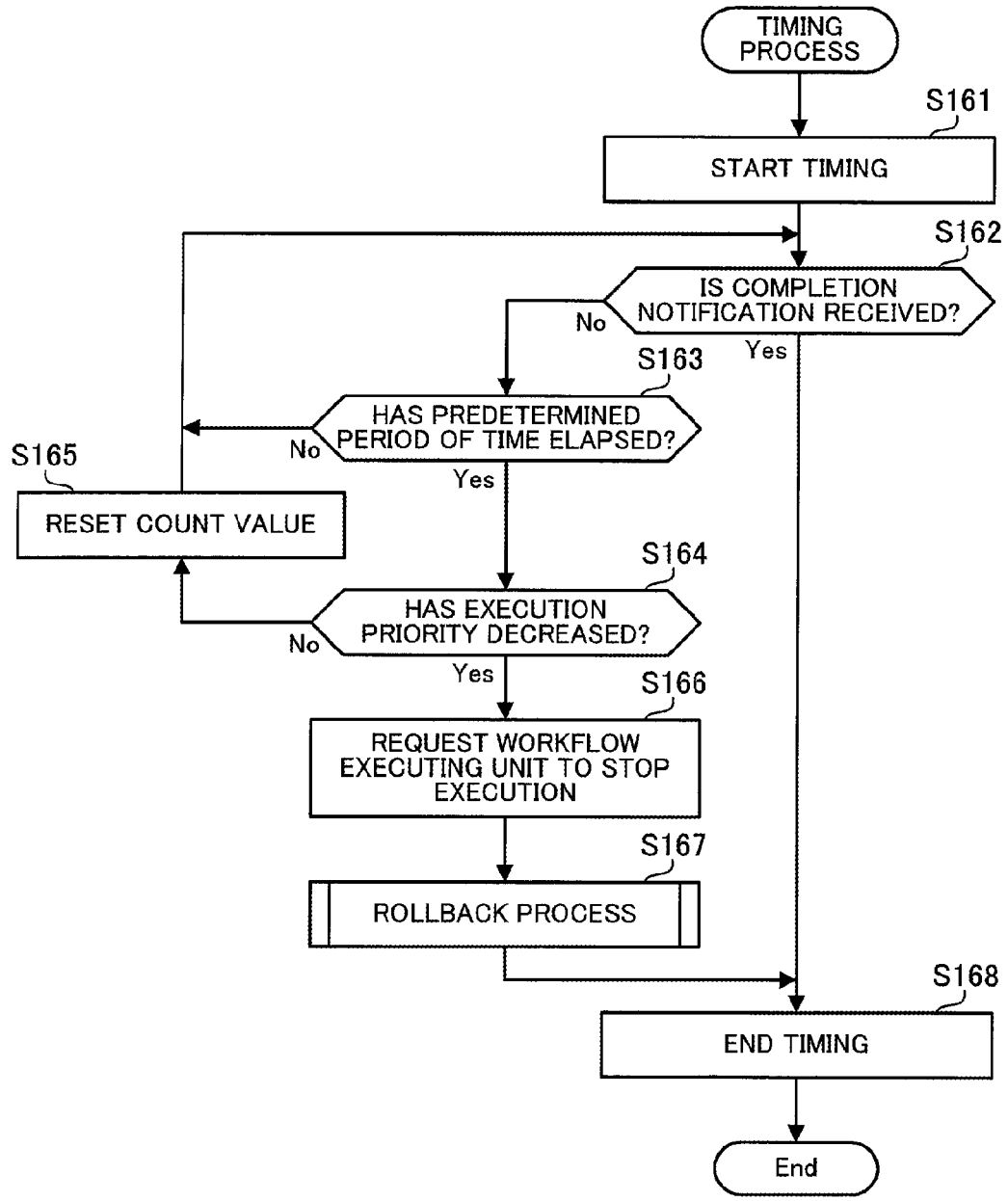
FIG. 38 is a flowchart illustrating an example of a timing process.

FIG. 38 is a flowchart illustrating an example of a timing process. The process of FIG. 38 is started in step S77 of FIG. 32, independently of the process of FIG. 32.

[Step S161] The exclusive section control unit 110 resets the time count value to zero and then starts timing. From that point in time onward, the exclusive section control unit 110 monitors completion notification indicating that a target activity has been completed successfully, sent from the corresponding workflow executing unit 120.

[Step S162] If the exclusive section control unit 110 receives the completion notification, the process moves to step S168. On the other hand, if the exclusive section control unit 110 has yet to receive the completion notification, the process moves to step S163.

[Step S163] The exclusive section control unit 110 determines whether the time count value has reached a predetermined threshold value. If the count value has reached the threshold value, the process moves to step S164. On the other hand, if the count value has yet to reach the threshold value, the process moves to step S162.

[Step S164] The exclusive section control unit 110 acquires execution priority of an exclusive section including the target activity as well as execution priority of exclusive sections of other workflows, which exclusive sections operate on the same resource as that of the exclusive section including the target activity. Then, the exclusive section control unit 110 compares the execution priority among the exclusive sections.

If the execution priority of the exclusive section including the target activity is lower than that of other exclusive sections, the process moves to step S166. On the other hand, if the execution priority of the exclusive section including the target activity is equal to or higher than that of other exclusive sections, the process moves to step S165.

[Step S165] The exclusive section control unit 110 resets the time count value to zero.

[Step S166] The exclusive section control unit 110 requests the corresponding workflow executing unit 120 to stop the execution of the target activity. This forcibly terminates the operation of the target activity.

[Step S167] The exclusive section control unit 110 rolls back the operation to the beginning of the exclusive section including the target activity. Although not illustrated in FIG. 38, the rollback-target section of step S167 is, in fact, determined in the same manner as in steps S182 to S184 of FIG. 39 below. For example, if a starting point of parallel branches comes before the exclusive section including the target activity, the operation of each of the parallel branches is rolled back to the branch starting point.

When the rollback process is completed, the exclusive section control unit 110 terminates the exclusive right given to a workflow including the target activity. Note that details of the rollback process are described in FIG. 40.

[Step S168] The exclusive section control unit 110 ends timing.

According to the process of FIG. 38, when instructing the workflow executing unit 120 to execute an activity involving a process according to an input operation by a person, the exclusive section control unit 110 starts timing and monitors whether the activity is completed successfully within a predetermined time frame. If the activity is not completed within the predetermined time frame, the activity is assumed to remain in a state waiting long for an input operation by a person. In this case, by forcibly terminating the execution of the activity, the exclusive section control unit 110 prevents a delay in the execution of the activity from influencing the schedule for executing other workflows.

Note however that even when an activity is not completed within the predetermined time frame, a delay in the execution of the activity is believed not to particularly affect the schedule for executing other workflows if an exclusive section including the activity has the highest execution priority. In view of this, in such a case, the exclusive section control unit 110 continuously monitors whether the execution of the activity is completed until an additional period of time has elapsed, instead of terminating the execution of the activity.

Figure 39:
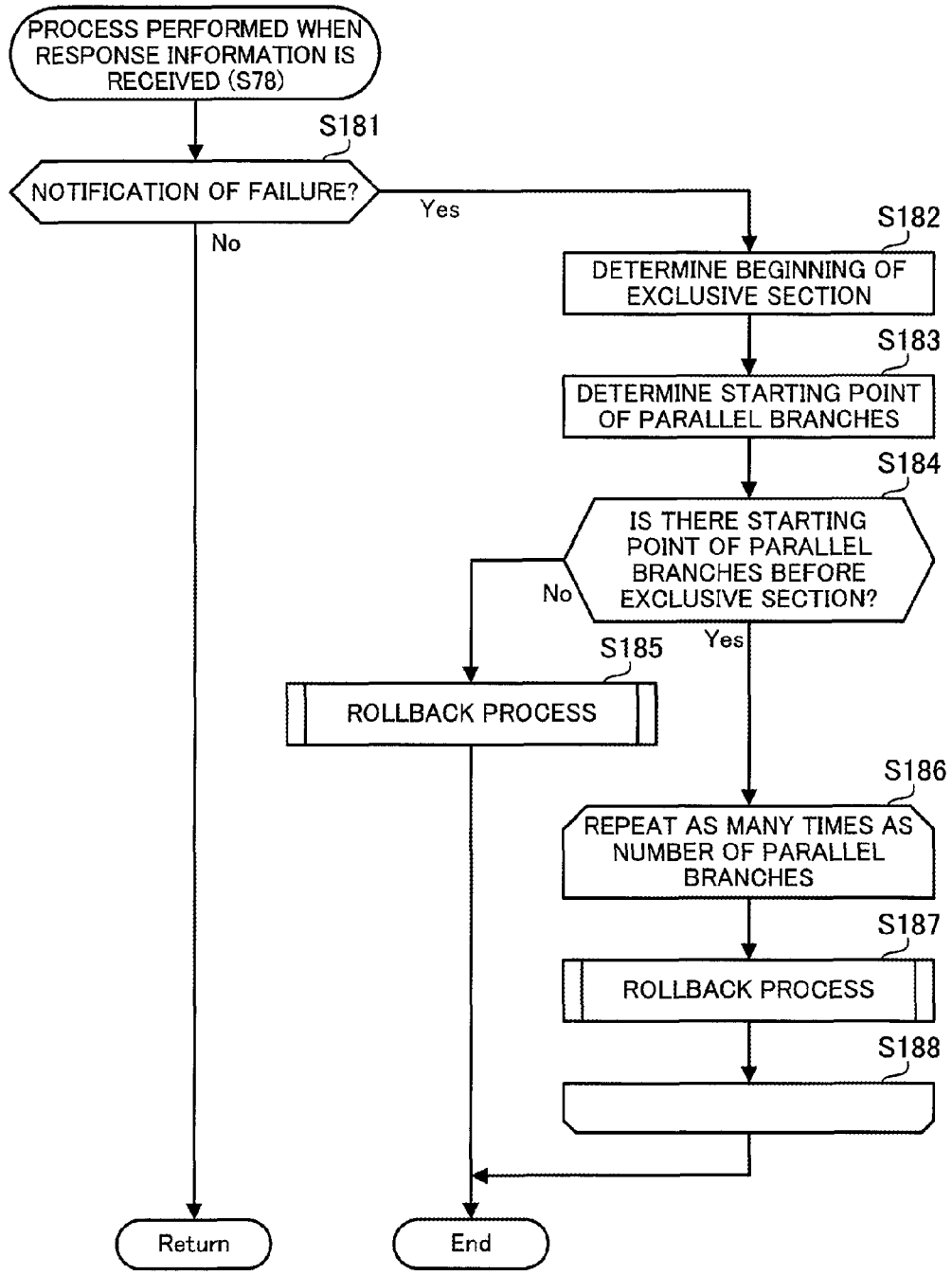
FIG. 39 is a flowchart illustrating an example of a process performed when response information is received.

FIG. 39 is a flowchart illustrating an example of a process performed when response information is received. The process of FIG. 39 corresponds to step S78 of FIG. 32.

[Step S181] The exclusive section control unit 110 determines whether response information sent from the workflow executing unit 120 indicates successful operation completion or failure occurrence. If successful operation completion is notified, the process of FIG. 39 is ended and then step S79 of FIG. 32 is carried out. On the other hand, if failure occurrence is notified, the process moves to step S182.

[Step S182] The exclusive section control unit 110 determines the beginning of an exclusive section including a failed task. Specifically, with reference to the exclusive right acquisition history table 136, the exclusive section control unit 110 extracts an exclusive section number associated with the number of a workflow including the failed task. Next, with reference to the exclusive section management table 135, the exclusive section control unit 110 extracts, from an entry under the column headed 'part number (lock start)' corresponding to the exclusive section number extracted from the exclusive right acquisition history table 136, a part number indicating the first task of the exclusive section.

[Step S183] With reference to the workflow management table 131, the exclusive section control unit 110 determines, within the workflow including the failed task, the location of a parallel branch point coming before and closest to the failed task.

Note that the operation order of steps S182 and S183 may be reversed.

[Step S184] If there is a starting point of the parallel branches before the beginning of the exclusive section determined in step S182, the process moves to step S186. On the other hand, if there is no starting point of parallel branches before the beginning of the exclusive section determined in step S182, the process moves to step S185.

[Step S185] The exclusive section control unit 110 rolls back the operation to the beginning of the exclusive section including the failed task. When completing the rollback process, the exclusive section control unit 110 terminates the exclusive right given to the workflow including the failed task. Note that details of the rollback process are explained in FIG. 40.

[Steps S186 to S188] The rollback process of step S187 is carried out for each of a plurality of branches executed in parallel following the starting point of the parallel branches determined in step S183. That is, the process of step S187 is looped as many times as the number of the branches executed in parallel.

When the rollback process for each of the parallel branches is completed, the exclusive section control unit 110 terminates the exclusive right given to the workflow including the failed task. Note that details of the rollback process are explained in FIG. 40.

According to the process of FIG. 39, when task failure occurrence is notified by the workflow executing unit 120 in the case where there is no starting point of parallel branches before the beginning of an exclusive section including a failed task, rollback is performed to the beginning of the exclusive section. This restores a corresponding operation-target resource to its former state just before the execution of the exclusive section. Then, in this condition, the exclusive right given to the rolled-back exclusive section is terminated, which allows a different workflow to operate on the operation-target resource.

In addition, when task failure occurrence is notified by the workflow executing unit 120 in the case where there is a starting point of parallel branches before the beginning of an exclusive section including a failed task, rollback is performed for each of the parallel branches. In this manner, a corresponding operation-target resource is reliably restored to its former state prior to the start of the parallel branches. This reduces not only the probability of failure occurrence in a different workflow due to stop of the exclusive section including the failed task, but also the probability of failure occurrence in a different workflow due to stop of the operation of a different exclusive section executed in parallel with the exclusive section including the failed task.

Figure 40:
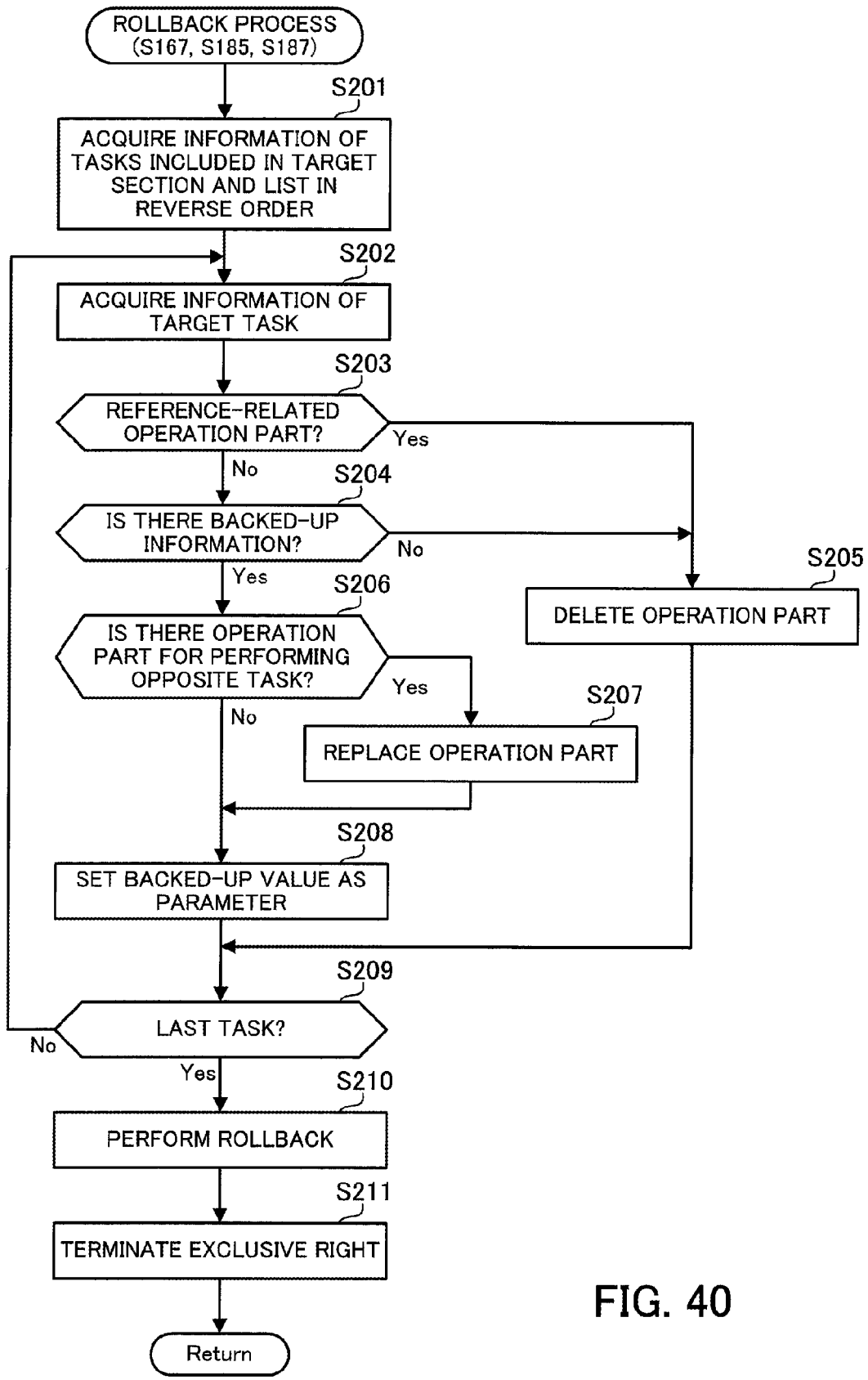
FIG. 40 is a flowchart illustrating an example of the rollback process.

FIG. 40 is a flowchart illustrating an example of a rollback process. The process of FIG. 40 corresponds to each of step S167 of FIG. 38, and steps S185 and S187 of FIG. 39.

[Step S201] The exclusive section control unit 110 acquires, from the workflow management table 131, task names (information registered in the operation part name column) included in a rollback-target section, and registers the task names in a task list in reverse order. The task list is temporarily generated, for example, in the RAM 102 of the operation automation server 100.

[Step S202] The exclusive section control unit 110 selects one rollback-target task from the task list, and acquires information of the task.

[Step S203] The exclusive section control unit 110 determines whether the selected task is a reference-related operation part. If the selected task is a reference-related operation part, the process moves to step S205. On the other hand, if the selected task is not a reference-related operation part, the process moves to step S204.

[Step S204] The exclusive section control unit 110 determines whether, in the workflow management table 131, information is stored in an entry under the column headed 'backup resource', corresponding to the selected task. If information is stored in the entry, the process moves to step S206. On the other hand, if information is not stored in the entry, the process moves to step S205.

[Step S205] When the selected task is a reference-related operation part (step S203: Yes), no particular operation is needed in order to restore a corresponding operation-target resource to its former state. When no information is stored in the corresponding entry under the column headed 'backup resource' (step S204: No), the selected task has not, in fact, been executed. Therefore, in this case also, no particular operation is needed in order to restore the operation-target resource to its former state.

For this reason, the exclusive section control unit 110 deletes the information of the selected task from the task list. Herewith, as for the selected task, no particular operation to restore the operation-target resource to its former state prior to the selected task is executed in later step S210. In this manner, it is possible to ensure that the operation-target resource is restored to its former state before the execution of the rollback-target section.

[Step S206] The exclusive section control unit 110 determines whether an operation part for carrying out an opposite task to the selected task has been registered in the paired parts definition table 140. If an operation part for carrying out the opposite task has been registered in the paired parts definition table 140, the process moves to step S207. On the other hand, if such an operation part has not been registered, the process moves to step S208.

[Step S207] The exclusive section control unit 110 extracts, from the paired parts definition table 140, a name of the operation part for carrying out the opposite task to the selected task. The exclusive section control unit 110 replaces, within the task list, the information in the operation part name column, corresponding to the selected task, with the operation part name extracted from the paired parts definition table 140.

[Step S208] The exclusive section control unit 110 reads, from the workflow management table 131, information registered in an entry under the column headed 'backup resource', corresponding to the selected task, and sets, in the task list, the information in association with the corresponding task.

[Step S209] The exclusive section control unit 110 determines whether the selected task is the last task in the task list. If the selected task is not the last task in the task list, the processing from step S202 onward is executed on an unselected task. If the selected task is the last task in the task list, the process moves to step S210.

[Step S210] The exclusive section control unit 110 performs rollback by tracing the task list in order. The exclusive section control unit 110 sequentially selects records from the top of the task list, and causes the business server 210 to execute a task corresponding to a task name registered for each of the selected records using the information set for the selected record in step S208.

[Step S211] When the rollback is completed, the exclusive section control unit 110 terminates the exclusive right set for the rollback-target section. Specifically, the exclusive section control unit 110 deletes a record corresponding to the exclusive section set within the rollback-target section from the instance management table 134, the exclusive section management table 135 and the exclusive right acquisition history table 136.

This allows a different workflow to operate on a corresponding exclusive resource. For example, in the case where an operation part for operating on the corresponding exclusive resource, which operation part is included in a different workflow, has been in a wait state in step S146 of FIG. 37, the above-described rollback process allows the operation part to be executed.

Note that the processing functions of the apparatuses (such as the workflow control apparatus 1 and the operation automation server 100) described in each of the embodiments above may be achieved by a computer. In this case, a program is provided which describes processing contents of the functions to be implemented by each of the apparatuses. By executing the program on the computer, the above-described processing functions are achieved on the computer. The program in which the processing contents are described may be recorded on computer-readable recording media. Such computer-readable recording media include a magnetic storage device, an optical disk, a magneto-optical recording medium, and a semiconductor memory. Examples of the magnetic storage device are a hard disk drive (HDD), a flexible disk (FD), and a magnetic tape. Examples of the optical disk are a digital versatile disc (DVD), a DVD-RAM, a compact disc-read only memory (CD-ROM), a CD-recordable (CD-R) and a CD-rewritable (CD-RW). An example of the magneto-optical recording medium is a magneto-optical disk (MO).

To distribute the program, for example, portable recording media, such as DVDs and CD-ROMs, on which the program is recorded are sold. In addition, the program may be stored in a storage device of a server computer and then transferred from the server computer to another computer via a network.

The computer for executing the program stores, for example, in its own storage device, the program which is originally recorded on a portable recording medium or transferred from the server computer. Subsequently, the computer reads the program from its own storage device and performs processing according to the program. Note that the computer is able to read the program directly from the portable recording medium and perform processing according to the program. In addition, the computer is able to sequentially perform processing according to a received program each time such a program is transferred from the server computer connected via the network.

According to one aspect, it is possible to successfully execute a second workflow after the execution of a first workflow is stopped.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the designation relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A computer-readable non-transitory storage medium storing therein a control program that automatically executes workflows in a predetermined order, the control program causing a computer to execute a procedure comprising:
   executing a first workflow;
   monitoring execution of the first workflow;
   identifying a top computer task of a series of computer tasks when execution of one of the computer tasks included in the first workflow is stopped, the series of computer tasks being included in the first workflow, including the stopped computer task and using a same resource, the resource being another computer or a program executed by said another computer;
   restoring the resource to a former state thereof prior to the execution of the top computer task by executing one or more state restoring processes, each for restoring the resource to the state prior to the execution of a corresponding one of the computer tasks spanning from the stopped computer task to the top computer task of the series of computer tasks; and
   starting execution of a computer task included in a second workflow, using the resource.

2. The computer-readable non-transitory storage medium according to claim 1, wherein:
   the procedure further comprises stopping execution of a computer task included in the first workflow and involving a process of receiving an input operation when the execution of the computer task is not completed within a predetermined time frame.

3. The computer-readable non-transitory storage medium according to claim 1, wherein:
   the procedure further comprises storing, in a storage unit, an information piece indicating a state of the resource prior to execution of each of the computer tasks included in the first workflow; and
   the restoring includes restoring the resource to the former state based on content of each of executed computer tasks among the computer tasks included in the series of computer tasks and the information piece indicating the state of the resource prior to the execution of each of the executed computer tasks.

4. The computer-readable non-transitory storage medium according to claim 3, wherein:
the storing includes storing, for an update computer task of updating data stored in the resource among the computer tasks included in the first workflow, pre-update data as the information piece associated with the execution of the update computer task; and
the restoring includes executing, as one of the state restoring processes corresponding to the update computer task, a computer task of reading the pre-update data corresponding to the update computer task from the storage unit and updating updated data stored in the resource with the read pre-update data when the update computer task is included in the computer tasks spanning from the stopped computer task to the top computer task of the series of computer tasks.

5. The computer-readable non-transitory storage medium according to claim 3, wherein:
the storing includes storing, when there is, among the computer tasks included in the first workflow, a computer task whose execution has been omitted, information indicating the omission of the execution of the computer task; and
the restoring includes skipping one of the state restoring processes corresponding to the omitted computer task based on the stored information when the omitted computer task is included in the computer tasks spanning from the stopped computer task to the top computer task of the series of computer tasks.

6. The computer-readable non-transitory storage medium according to claim 3, wherein:
the storing includes storing, when the first workflow includes one or more computer tasks using a first resource and one or more computer tasks using a second resource, an information piece indicating a state of the first resource prior to execution of each of the computer tasks using the first resource and an information piece indicating a state of the second resource prior to execution of each of the computer tasks using the second resource; and
the restoring includes restoring each of the first resource and the second resource to a former state thereof prior to execution of parallel branches based on the stored information pieces when the first workflow includes the parallel branches, a first series of computer tasks using the first resource is included in a first branch of the parallel branches, a second series of computer tasks using the second resource is included in a second branch of the parallel branches, and then a computer task included in the second series of computer tasks is stopped.

7. The computer-readable non-transitory storage medium according to claim 1, wherein:
each of the state restoring processes is a computer task opposite to the corresponding one of the computer tasks spanning from the stopped computer task to the top computer task of the series of computer tasks.

8. The computer-readable non-transitory storage medium according to claim 1, wherein:
the first workflow further includes another series of computer tasks using the resource,
the executing includes executing the series of computer tasks after executing said another series of computer tasks, and
the identifying includes identifying the top computer task of the series of computer tasks when one of the computer tasks included in the series of computer tasks is stopped.

9. A workflow control apparatus for automatically executing workflows in a predetermined order, the workflow control apparatus comprising:
a processor configured to perform a procedure including:
executing a first workflow;
monitoring execution of the first workflow;
identifying a top computer task of a series of computer tasks when execution of one of the computer tasks included in the first workflow is stopped, the series of computer tasks being included in the first workflow, including the stopped computer task and using a same resource, the resource being another computer or a program executed by said another computer;
restoring the resource to a former state thereof prior to the execution of the top computer task by executing one or more state restoring processes, each for restoring the resource to the state prior to the execution of a corresponding one of computer tasks spanning from the stopped computer task to the top computer task of the series of computer tasks; and
starting execution of a computer task included in a second workflow, using the resource.

10. The workflow control apparatus according to claim 9, wherein:
the procedure further includes stopping execution of a computer task included in the first workflow and involving a process of receiving an input operation when the execution of the computer task is not completed within a predetermined time frame.

11. The workflow control apparatus according to claim 9, wherein:
the procedure further includes storing, in a storage apparatus, an information piece indicating a state of the resource prior to execution of each of the computer tasks included in the first workflow; and
the restoring includes restoring the resource to the former state based on content of each of executed computer tasks among the computer tasks included in the series of computer tasks and the stored information piece indicating the state of the resource prior to the execution of each of the executed computer tasks.

12. The workflow control apparatus according to claim 11, wherein:
the storing includes storing, for an update computer task for updating data stored in the resource among the computer tasks included in the first workflow, pre-update data as the information piece associated with the execution of the update computer task; and
the restoring includes executing, as one of the state restoring processes corresponding to the update computer task, a computer task of reading the pre-update data corresponding to the update computer task from the storage apparatus and updating updated data stored in the resource with the read pre-update data when the update computer task is included in the computer tasks spanning from the stopped computer task to the top computer task of the series of computer tasks.

13. The workflow control apparatus according to claim 11, wherein:

the storing includes storing, when there is, among the computer tasks included in the first workflow, a computer task whose execution has been omitted, information indicating the omission of the execution of the computer task; and the restoring includes skipping one of the state restoring processes corresponding to the omitted computer task based on the stored information when the omitted computer task is included in the computer tasks spanning from the stopped computer task to the top computer task of the series of computer tasks.

14. The workflow control apparatus according to claim 11, wherein:

the storing includes storing, when the first workflow includes one or more computer tasks using a first resource and one or more computer tasks using a second resource, an information piece indicating a state of the first resource prior to execution of each of the computer tasks using the first resource and an information piece indicating a state of the second resource prior to execution of each of the computer tasks using the second resource; and the restoring includes restoring each of the first resource and the second resource to a former state thereof prior to execution of parallel branches based on the stored information pieces when the first workflow includes the parallel branches, a first series of computer tasks using the first resource is included in a first branch of the parallel branches, a second series of computer tasks using the second resource is included in a second branch of the parallel branches, and then a computer task included in the second series of computer tasks is stopped.

15. The workflow control apparatus according to claim 9, wherein:

each of the state restoring processes is a computer task opposite to the corresponding one of the computer tasks spanning from the stopped computer task to the top computer task of the series of tasks.

16. A workflow control method for automatically executing workflows in a predetermined order, the workflow control method comprising:

executing, by a computer, a first workflow;

monitoring, by the computer, execution of the first workflow;

identifying, by the computer, a top computer task of a series of computer tasks when execution of one of the computer tasks included in the first workflow is stopped, the series of computer tasks being included in the first workflow, including the stopped computer task and using a same resource, the resource being another computer or a program executed by said another computer;

restoring, by the computer, the resource to a former state thereof prior to the execution of the top computer task by executing one or more state restoring processes, each for restoring the resource to the state prior to the execution of a corresponding one of computer tasks spanning from the stopped computer task to the top computer task of the series of computer tasks; and starting, by the computer, execution of a computer task included in a second workflow, using the resource.

* * * * *